US012748855B2

(12) United States Patent
Mccann et al.

(10) Patent No.: US 12,748,855 B2
(45) Date of Patent: Sep. 29, 2026

(54) HIERARCHICAL REPRESENTATION MODELS

(71) Applicant: Microsoft Technology Licensing, LLC, Redmond, WA (US)

(72) Inventors: Robert Lee Mccann, Snoqualmie, WA (US); Scott Alexander Freitas, Phoenix, AZ (US); Jovan Kalajdjieski, Vancouver (CA); Amirhossein Gharib, Toronto (CA)

(73) Assignee: Microsoft Technology Licensing, LLC, Redmond, WA (US)

( * ) Notice: Subject to any disclaimer, the term of this patent is extended or adjusted under 35 U.S.C. 154(b) by 272 days.

(21) Appl. No.: 18/393,631

(22) Filed: Dec. 21, 2023

(65) Prior Publication Data

US 2025/0103722 A1 Mar. 27, 2025

Related U.S. Application Data

(60) Provisional application No. 63/585,153, filed on Sep. 25, 2023.

(51) Int. Cl.

| | |
|---|---|
| ***G06F 21/57*** | (2013.01) |
| ***G06F 16/28*** | (2019.01) |
| ***G06F 40/40*** | (2020.01) |

(52) U.S. Cl.

CPC .......... *G06F 21/577* (2013.01); *G06F 16/285* (2019.01); *G06F 40/40* (2020.01)

(58) Field of Classification Search

CPC .................................. G06F 40/40; G06N 5/01

See application file for complete search history.

(56) References Cited

U.S. PATENT DOCUMENTS

| | | |
|---|---|---|
| 10,325,673 B2 | 6/2019 | Aliper |
| 10,671,917 B1 | 6/2020 | Bhattacharyya |

(Continued)

FOREIGN PATENT DOCUMENTS

| | | |
|---|---|---|
| CN | 107423820 B | 9/2020 |
| CN | 113204577 A | 8/2021 |
| CN | 114461929 A | 5/2022 |

OTHER PUBLICATIONS

Ren, et al., "AFET: Automatic Fine-Grained Entity Typing by Hierarchical Partial-Label Embedding", In Proceedings of the Conference on Empirical Methods in Natural Language Processing, Nov. 1, 2016, pp. 1369-1378.

(Continued)

*Primary Examiner* — Barbara B Anyan

(74) *Attorney, Agent, or Firm* — Pillsbury Winthrop Shaw Pittman LLP

(57) ABSTRACT

A computer-implemented method comprising: receiving a first input associated with a first entity at a first level of a hierarchy; receiving a second input, associated with a second entity at a second level of the hierarchy, the second entity linked to the first entity within the hierarchy; generating a first low-dimensional feature representation based on the first input, the first low-dimensional feature representation representing the first entity; and generating a second low-dimensional feature representation based on the first input, the second input and the first low-dimensional feature representation, the second low-dimensional feature representation representing the second entity.

20 Claims, 12 Drawing Sheets

(56) References Cited

U.S. PATENT DOCUMENTS

| | | | | |
|---|---|---|---|---|
| 11,573,994 | B2 | 2/2023 | Glass | |
| 12,393,786 | B2 * | 8/2025 | Wolfe | G06N 5/01 |
| 2019/0073580 | A1 | 3/2019 | Dzhulgakov | |
| 2023/0222387 | A1 | 7/2023 | Kumar | |
| 2025/0103722 | A1 * | 3/2025 | Mccann | G06F 40/40 |

OTHER PUBLICATIONS

Zhang, et al., "Learning Hierarchy-Aware Knowledge Graph Embeddings for Link Prediction", In Proceedings of the AAAI Conference on Artificial Intelligence, vol. 34, Issue No. 03, Apr. 3, 2020, pp. 3065-3072.

International Search Report and Written Opinion received for PCT Application No. PCT/US2024/045912, mailed on Jun. 27, 2025, 14 pages.

International Preliminary Report On Patentability received for PCT Application No. PCT/US2024/045912, mailed on Apr. 2, 2026, 08 pages.

* cited by examiner

HIERARCHICAL REPRESENTATION MODELS

CROSS-REFERENCE TO RELATED APPLICATION

This application claims priority to U.S. Provisional Patent Application No. 63/585,153, entitled "HIERARCHICAL REPRESENTATION MODELS," filed on Sep. 25, 2023, the disclosure of which is incorporated herein by reference in its entirety.

BACKGROUND

Hierarchical systems exist in a broad range of fields, including computer networks, computer security management systems, transportation networks, and operating systems. Users and analysts of such systems may need to make decisions based on the status of entities at various levels of the hierarchy.

For example, within a security operations centre (SOC) of an organisation, an analyst may review data comprising incidents, alerts and evidence generated by a security management system of the organisation configured to monitor activity on the organisation's computer network(s) and generate alerts and incidents. Incidents, alerts and evidence form a hierarchy with incidents at a top level, alerts at an intermediate level, and evidence at a bottom level. Each top-level incident is associated with one or more intermediate-level alerts. Each intermediate-level alert is, in turn, associated with one or more low-level evidence entities. Evidence entities may include, for example, emails, processes, IP addresses or files associated with an alert. An alert may be a notification generated based on an identified threat. An incident may be a collection of alerts that have been identified as related (for example belonging to a single cyberattack). Analysts of a security system review alerts and incidents in order to take mitigating or other security actions in respect of both individual alerts and incidents as a whole.

Machine learning models can be employed in various fields to analyse a real-world system, such as a computer network or a transportation network, and provide outputs based on which a computer system or a human user can implement suitable actions in relation to entities of the system. Machine learning models are typically trained to make predictions about a given entity by processing a suitable input representation of that entity. For complex inputs, including text, categorical data, structured data, image data, audio, etc., the representation that the model is configured to consume is typically a low-dimensional feature representation of the input data. It is important that the features provided to the machine learning model are sufficiently representative of the input data that accurate predictions can be made.

In some existing systems, explicit feature engineering is used to define features of a low-dimensional representation. This involves constructing new features which can be represented numerically, based on existing attributes of the input. Alternatively, neural network-based models, including autoencoders, and other dimensionality reduction techniques can be used to generate low-dimensional numerical representations of various types of inputs.

SUMMARY

Described herein is a method of generating low-dimensional representations for hierarchical data. The methods described herein use a novel hierarchical architecture to process data entities at different levels of a hierarchy and generate corresponding low-dimensional representations at each level. Embedding components at each level of the hierarchy are configured to process data corresponding to that level, as well as input data from the lower levels of the hierarchy, provided via skip connections, and outputs of the embedding components at lower levels of the hierarchy, provided via hierarchical connections. This novel architecture, which provides greater connectivity between representation learning components at each level, allows more accurate low-dimensional representations to be learned for hierarchical data.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Nor is the claimed subject matter limited to implementations that solve any or all of the disadvantages noted herein.

BRIEF DESCRIPTION OF THE DRAWINGS

To assist understanding of the present disclosure and to show how embodiments may be put into effect, reference is made by way of example to the accompanying drawings in which.

DETAILED DESCRIPTION OF EMBODIMENTS

Figure 1A:
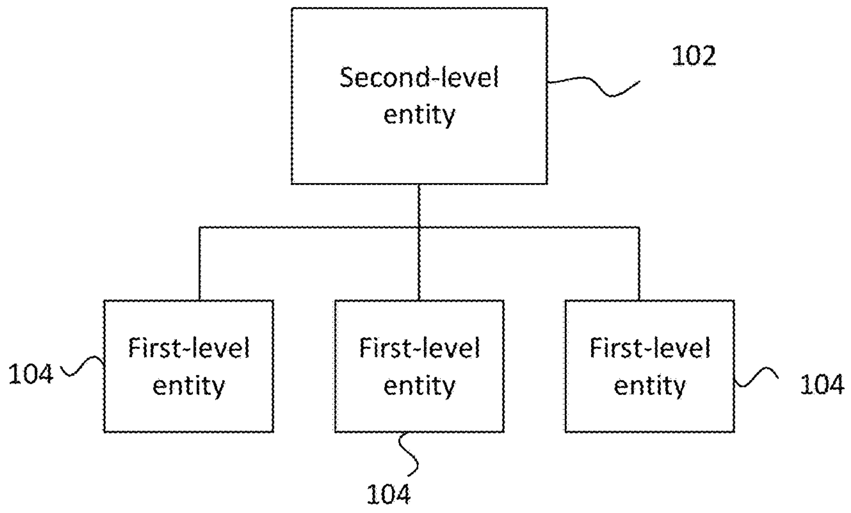
FIG. 1A is a schematic block diagram of an example two-level data hierarchy.

Machine learning models are used across a large variety of technical domains, in order to process data relating to various real-world systems and make predictions or recommendations. A key step in applying machine learning models is the generation of input data which is representative of the underlying real-world data in a format suitable for processing by the machine learning model. The field of representation learning is concerned with methods and models for generating representative inputs for machine learning models that capture sufficient information in the input data for the downstream machine learning model to make accurate predictions. For example, an autoencoder is a known neural network which can be used to generate low-dimensional numerical representations of textual inputs. Other neural network architectures are known which can be trained on existing data to generate numerical embeddings of text inputs or inputs of other formats.

Some data has a hierarchical structure, comprising entities at multiple levels, with each entity at a top level of the hierarchy being associated with one or more entities at the next level of the hierarchy, and so on. A potential problem with generating representations for entities at upper levels of such a hierarchy is that conventional methods may not sufficiently capture the hierarchical relationships between those entities and the related entities at lower levels of the hierarchy. Some systems may define a separate representation model for each type of entity, and process the entities at each level of the hierarchy separately in order to provide a suitable representation for a machine learning model performing a downstream task. However, this approach does not provide representations that capture the hierarchical nature of the input data, or the relationships between entities at different levels.

Described herein are methods and models for generating representations for hierarchical data that takes in data at all levels of the hierarchy and processes them together, generating representations for entities at different levels of the hierarchy that takes the hierarchical structure into account. Input data representing entities of a hierarchical model could include image data, textual data, numerical data, categorical data, audio data, video data, speech inputs, among others, and is typically provided as a combination of at least two different types of input data. The hierarchical representation learning model employs multimodal machine learning at each level of the hierarchy to process data of different types in order to generate a single embedding. It should be noted that, while the detailed description of FIGS. 5-7 relates to the specific example implementation of generating representations for security data that comprises text, categorical data, and numerical data, the hierarchical model is not limited to input data of any particular form, and any suitable models can be applied at different levels of the hierarchy to generate embeddings for each type of data. For example, while a large language model is used in the described example to convert a text input to a numerical output, a convolutional neural network may be used to process image data, for example.

Also described herein are machine learning models configured to process the numerical representations generated by the hierarchical representation model. A system for managing security alerts and incidents in a distributed computer network is described herein using the hierarchical representation model and machine learning models described herein to process security data on the network and provide recommendations for individual alerts and incidents. However, it should be noted that the hierarchical representation model described herein may be applied to hierarchical input data in a broad range of domains, including transportation networks, systems biology, etc.

The present disclosure presents a new architecture for learning hierarchical representations, in which a representation learned at a given level of the hierarchy is provided to the next level of the hierarchy as a 'hierarchical' connection, while the input to the given level of the hierarchy is also provided to the next level of the hierarchy as a 'residual' connection. This allows a representation to be learned at each level, such that important information based on the input entity at that level can be captured, while the use of residual connections allows information about the input at lower levels of the hierarchy to be taken into account in higher-level representations, and does not constrain the representation at higher levels only to the features learned at the lower levels.

One embodiment of the invention described herein comprises a hierarchical representation model configured to process a hierarchy of evidence, alerts, at a security operations centre (SOC), as part of a security management system configured to monitor the security of a computer network of an organisation. An SOC typically employs human analysts who review security alerts and determine actions to be taken on the network to remediate identified security issues. The efficiency of an SOC is crucial to maintaining effective cybersecurity. An SOC is responsible for monitoring and responding to security alerts and incidents (also referred to as security telemetry data), generated by the security management system based on activity of the computer network, which may be an enterprise network. The ability of an SOC to do so quickly and accurately can be decisive in preventing a data breach or other security incident. An SOC is the front line of defence against cyber threats, and its ability to identify and respond to security alerts ad incidents is critical to protecting an organization's sensitive data and assets. In addition to identifying and responding to security threats, an SOC must also be able to investigate threats to determine the root cause and prevent similar threats from occurring in the future.

However, the effectiveness of a SOC can be hampered by alert and incident fatigue, which can lead to missed or ignored alerts. When a security system generates too many alerts, it can be difficult for the SOC team (i.e. a team of human analysts) to keep up with them all, and to prioritise the most urgent alerts and incidents. This can be especially problematic when dealing with sophisticated cyberattacks that may be designed to evade detection. SOC teams must be able to quickly and accurately identify and respond to security alerts and incidents in order to minimize the impact of a security breach. Furthermore, with the increasing volume of data and alerts generated by security tools, it can be difficult for SOC analysts to effectively process and analyze all the information. This can lead to information overload, where analysts are overwhelmed by the sheer amount of data and may miss important alerts or indicators that the computer network has been compromised. Lastly, the lack of available information for SOCs to make a definitive conclusion about a security event can also result in false positives or false negatives, leading to inefficient use of resources and potentially leaving the organization vulnerable to threats.

The approach described herein has a number of advantages over existing representation learning systems. Firstly, the methods described herein are flexible in that the data at each level of a hierarchy can be processed in any format. For example, in a security application, telemetry of evidence, alerts and incidents contains a lot of metadata, which can be difficult to process in standard machine learning settings. Previous approaches manually select features to be used in the feature representation, which can lead to sub-optimal solutions. The approach described herein removes any need to manually select features by allowing evidence, alerts and incident embedding models to learn which features are most representative at each level of the hierarchy. This also makes the hierarchical model described herein more durable, since the ability to use the whole feature space of the provided entities allows the model to evolve as the input data evolves, since it is not dependent on specific features of the entities. Another advantage of the methods described herein is robustness. The architecture can handle changes in the data sources without the need to make any change to the architecture.

A further advantage of the hierarchical model described herein is that it is adaptable and reusable to a variety of applications and types of hierarchical data. It is not dependent on the problem to be solved, and can be used for various problems having a hierarchical structure of entities. A respective machine learning model for achieving a required task can easily be trained to process an output of the hierarchical representation model described herein for any kind of hierarchical input data.

Another advantage of the solutions described herein is explainability. Most of the machine learning systems in use today do not offer an out-of-the-box explainability component, but the hierarchical approach herein provides explainable suggestions by leveraging the similarity between entities at different levels of the hierarchy. For example, in a security context, by looking at the similarity between embeddings at each level at the hierarchy, similar evidence/alerts/incidents can be identified. The residual connections between different levels of the hierarchy can be used to identify which features are being used for downstream tasks at each hierarchical level. Furthermore, task-specific predictions can be made at each hierarchical level, which allows for only the relevant context to be considered when making a prediction. For example, at the evidence level, the low-dimensional embedding generated for the evidence is based only on the evidence data, while at the entity level, predictions for alerts are based on a representation using both evidence and alert data. This provides an advantage over a system that processes hierarchical data at all levels together and makes predictions based on entities at the highest level of the hierarchy (for example, based on incident embeddings), since the context of a single representation of all hierarchy levels is less specific to the level of the entity.

Another advantage of the approach described herein is it can be set up to generate outputs defining actions that can be taken based on the given problem. In a security context, the approach described herein of applying a hierarchical model to learn a representation of an input, before applying a multi-task machine learning model to provide security classification outputs for different levels of the hierarchy can be applied within different security environments. Different systems may have different security requirements, and what is normal for one system may be abnormal for another. The described approach "auto fits" each system, so even without a user of the system stating the detailed preferences or requirements of that system, and fine tuning, the model is designed to work out-of-the-box. The machine learning model described herein for performing downstream tasks based on the generated representation may also be trained on individual systems or organisations' data in order to learn the preferences and requirements of that system for the given task.

The concept of hierarchical residual representation learning is reusable and is not dependent on the problem, but rather it can be used for any problem that contains a natural hierarchical data structure. The specific architecture behind the different entities in the hierarchy can be adapted to the problem, but the concept of hierarchical residual representation learning would still apply. The embeddings models (e.g. large language models, graph representation learning models, autoencoders, etc.) at each hierarchical level can be generically replaced with other types of machine learning model, which makes the concept of hierarchical residual representation learning applicable to various application domains and problems.

Sparse representation is used throughout the hierarchical representation model to store inputs and/or embeddings at each level of the hierarchy. Sparse representation storage is a way to compress sparse data into a lower-memory format for storage and transmission. This exploits the sparsity of the data to reduce the computer memory needed to store and process the low-dimensional embeddings on a computer system. The novel hierarchical model described herein has both residual connections and hierarchical connections via which data of lower levels of the hierarchy is provided as input to upper levels of the hierarchy. This leads to a large amount of data being input at higher levels of the hierarchy (e.g. each incident of an SOC is associated with multiple alerts, each alert having its own input representation and embedding, and each alert in turn being associated with multiple evidences, which are associated with their own input data and embedding. This leads to increasingly large input data to be processed at upper levels of the hierarchy. Storing each of the inputs and embeddings in a sparse representation storage format reduces the computer memory required and enables faster and more efficient processing of a large number of inputs, by reducing the memory required to store and process each individual input or embedding. This is particularly effective at higher levels of the hierarchy, for which the number of inputs from lower levels of the hierarchy is increased. The processing of each input or embedding is faster than for conventional methods, as less data needs to be processed in each operation.

The description below first outlines, in a general context, the use of a hierarchical residual representation model for representing entities at two levels of a hierarchy. FIGS. 2-7 relate to the specific application of this model to generate representations for entities of a hierarchical security alerts system, and the use of the representation within a further machine learning model configured to provide outputs to a user or a computer application or program, to enable actions to be taken to mitigate security risks on a computer network. Further details of particular implementation details for this application are provided throughout the description. Details of how individual elements of the network are trained and implemented will also be described with reference to FIGS. 8 and 9.

FIG. 1A shows an example data hierarchy comprising first and second levels. While the invention is described herein as applied to two levels of a hierarchy, it should be noted that the first and second levels shown in FIG. 1 can also be two levels of a larger hierarchy, and that the residual and hierarchical connections described here with reference to two levels can be extended to a hierarchy of arbitrary size. In the example shown, a single entity 102 at a second (higher) level of the hierarchy is associated with three entities 104 at a first (lower) level, though in general a hierarchy can comprise any number of connections between entities of different levels. Such a data hierarchy is seen throughout any number of real-world systems and applications. For example, within a computer file storage system, a folder can be considered an entity at a second level of a hierarchy, in which each file in the folder is considered a first-level entity in the hierarchy. In another example, in the field of genomics, a gene may be considered an entity at a second level of a hierarchy, and each protein produced by the given gene can be considered an entity at the first level of the hierarchy. Each gene is associated with multiple proteins at the lower level, while each protein at the lower level has a parent gene at the higher level. In a security system as described above and further below herein, alerts of the security operations centre could be considered entities of a second level of the hierarchy, while evidence relating to each alert corresponds to a first-level entity. Other hierarchies may have multiple 'parent' entities for a given 'child' entity, i.e. multiple entities at a higher level of the hierarchy connected to one entity at a lower level of the hierarchy. It will be understood these examples are not exhaustive, and a large variety of other examples of hierarchical data structures having different connectivity between levels can be found across various technical fields. The approach described herein can be applied to any type of multi-level data structures.

Figure 1B:
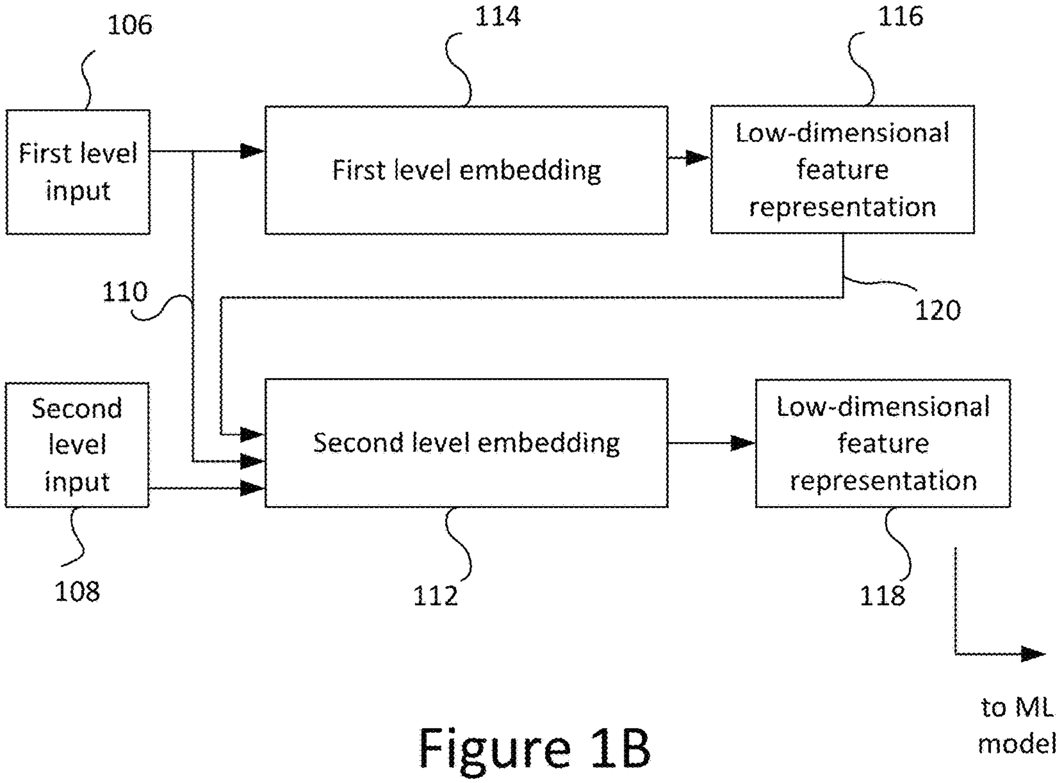
FIG. 1B is a schematic block diagram of a two-level hierarchical representation learning model.

FIG. 1B shows an example hierarchical representation learning model configured to generate a low-dimensional feature representation for entities at two levels of a hierarchy such as that shown in FIG. 1A. For example, this could be applied to evidences and alerts of a security model, or to alerts and incidents. Similarly, the same architecture could be used to process substation and station data of an electricity grid, or proteomic and genomic data of a biological system. The hierarchical representation model shown in FIG. 1B receives a first-level input 106, which corresponds to a first-level entity 104 of the entity. In some implementations, the data of the first-level entity may be input directly as the first-level input. For example, where the first-level entity is a piece of evidence associated with a security alert, such as an email, the contents of the email may be input directly to the first level embedding. However, in most embodiments, some pre-processing steps are taken to convert the first-level entity to a suitable format to provide to the first-level embedding component 114, for example by processing associated metadata of the entity, extracting text data from structured data, correcting data types and formats. The pre-processing could also include converting the storage format of the entity data into a sparse representation, which reduces the memory necessary to store the data.

The first-level input 106 is then provided to a first-level embedding component 114, which processes the input 106 in order to generate a low-dimensional feature representation. The low-dimensional feature representation takes the form of a numerical vector, and may also be referred to herein as an embedding. The first-level input could comprise various types of data, including text data, numerical data, and categorical data. As will be described in further detail below, various different types of model can be used by the first-level embedding component 114 to create a feature representation of the input. For example, the text of the input may be processed by a large language model trained to generate text representations based on an input text. Text and other non-numerical data (e.g. categorical data) can be converted to numerical representation (for example, using one-hot encoding) and combined with any numerical data of the input to determine a combined (high-dimensional) numerical representation, before using dimensionality reduction techniques such as singular value decomposition (SVD) or a trained autoencoder to reduce the size of the representation while retaining as much information from the input as possible to represent the input sufficiently well for downstream tasks.

The result of applying the models of the first-level embedding component 114 and performing dimensionality reduction to the combined result is a low-dimensional numerical feature representation. As in the step of pre-processing, a step can be performed just before the output of the low-dimensional feature representation to convert the representation in its given format to a sparse representation, which stores the data more efficiently in memory and reduces the memory and compute resources to store and process the low-dimensional feature representation 116.

At the second level of the hierarchical model, a second-level embedding component 112 is configured to receive inputs representing entities 102 at the second level of the hierarchy. As mentioned above, the hierarchy is such that each entity 102 in the second level of the hierarchy can be associated with multiple entities 104 of the first level of the hierarchy. When processing the data of the hierarchy, the first level embedding component 114 processes each individual entity 104 of the first level associated with a given entity 102 of the first level, and generates a low-dimensional feature representation 116 for each entity 104 associated with the entity 102. At the second level, the embedding component 112 receives a second-level input 108 corresponding to the data of the second-level entity 102. In the security example described further herein, this second-level input would be a data object corresponding to a security alert. As above, pre-processing steps may be applied to the data of the security alert (or other entity data of another system) to convert the data to a desired format, correct errors, or extract data in a structured format, as well as converting the input to a sparse representation.

At the second level of the hierarchy, there are two additional inputs which are used to generate the second-level embedding, representing the second-level entity 102. The second input is the low-dimensional feature representation 116 generated by the first-level embedding component 114 for each of the entities 104 associated with the entity in the hierarchy. Note that, although there can be multiple entities, and therefore multiple low-dimensional feature representations, associated with a given entity 102, these are represented in FIG. 1B as a single input to the second-level embedding for the sake of clarity. The third input to the second-level embedding component 112 is the first level input 106 as provided to the first-level embedding component 114. Again, this is provided for each first-level entity 104 associated with the second-level entity 102. The low-dimensional feature representation 116 is provided as an input to the second-level embedding component 112 via a connection 120, which is referred to herein as a 'hierarchical' connection. This connection provides a previously learned representation of the lower-level entities to the second-level representation model. The first-level input 106 is provided as input to the second-level embedding 112 via a connection 110, referred to herein as a 'residual' or 'skip' connection. The use of a residual connection allows low-level information in the first-level input to be re-injected into the second-level embedding, such that information that may not have been captured in the first-level embedding 116 may still be incorporated into the representation of the second-level entity 118.

As described for the first-level embedding above, the second-level embedding component 112 could implement various types of models to convert the first and second level inputs 106, 108 to a low-dimensional feature representation, which could include a large language model, such as a generative pre-trained transformer (GPT), to generate a numerical representation from text data, and/or dimensionality reduction techniques to generate a low-dimensional representation from the high-dimensional numerical representation of the combined inputs. The low-dimensional feature representation 118 is a numerical representation of the second-level entity 102 that takes into account the hierarchical structure of the entity by incorporating information from the first level input 106 and first-level embedding 116. This low-dimensional feature representation 118 (i.e. second-level embedding) can then be provided in a standard format of a predefined size to a further machine learning model configured to perform a task in respect of the second-level entity 106. As described in more detail in the example embodiments described below, a multi-task multi-class deep learning model can be used to process the low-dimensional representation of the second-level entity in order to perform multiple different tasks relating to the given entity. In the security implementation described herein, for example, the machine learning model may be trained to process the representation of a security alert in order to perform tasks including (a) predicting a grade for the given alert (such as 'true positive', 'false positive'), (b) identifying similar alerts within the set of received alerts, or (c) outputting an action to be taken by an analyst or security application to mitigate the security alert. An example multi-task model is described in further detail below with reference to FIG. 9.

As mentioned above, the hierarchical representation model described herein can be used to represent entities of a variety of real-world hierarchical systems. One example, security telemetry data generated a security operations centre (SOC), is described in greater detail below with reference to FIGS. 2-7. Another example application includes management of factory machines (i.e. a manufacturing system). Machines in a factory could form a hierarchy in the sense that the factory comprises multiple types of machines, each performing different purpose or manufacturing a different part or parts of an overall product, while each machine itself performs multiple processes. In the course of running the machines in the factory, large amounts of data are produced at each level of the hierarchy, which may relate to the condition of the machines, the speed at which the given parts are produced, or the time taken by individual processes. In this example, the hierarchical model can be used to generate suitable representations for entities at each level of the manufacturing hierarchy. For example, process data relating to individual processes of a given machine can be processed at a first level embedding component 114, where the resulting embedding, the process data, and further machine-level data are provided as inputs to a machine-level embedding component 112 to generate a representation of the given machine that takes into account the data of all the associate processes of that machine. These representations can be passed to a trained machine learning model, which may be a multi-task machine learning model such as that described below with reference to FIG. 9, or a single model configured to perform a single manufacturing-related task. For example, a model may automatically identify inefficiencies in processes performed by a given machine learning model, and this can be indicated to a system controlling the machine configuration, to automatically address the efficiency by changing the configuration of the machine. The same techniques can be used to generate representations and perform automatic actions in order to manage other system, such as vehicles, medical equipment, agricultural equipment, etc.

A specific hierarchical representation model using residual and hierarchical connections as described above will now be described in further detail for a security application with reference to FIGS. 2-7.

Figure 2:
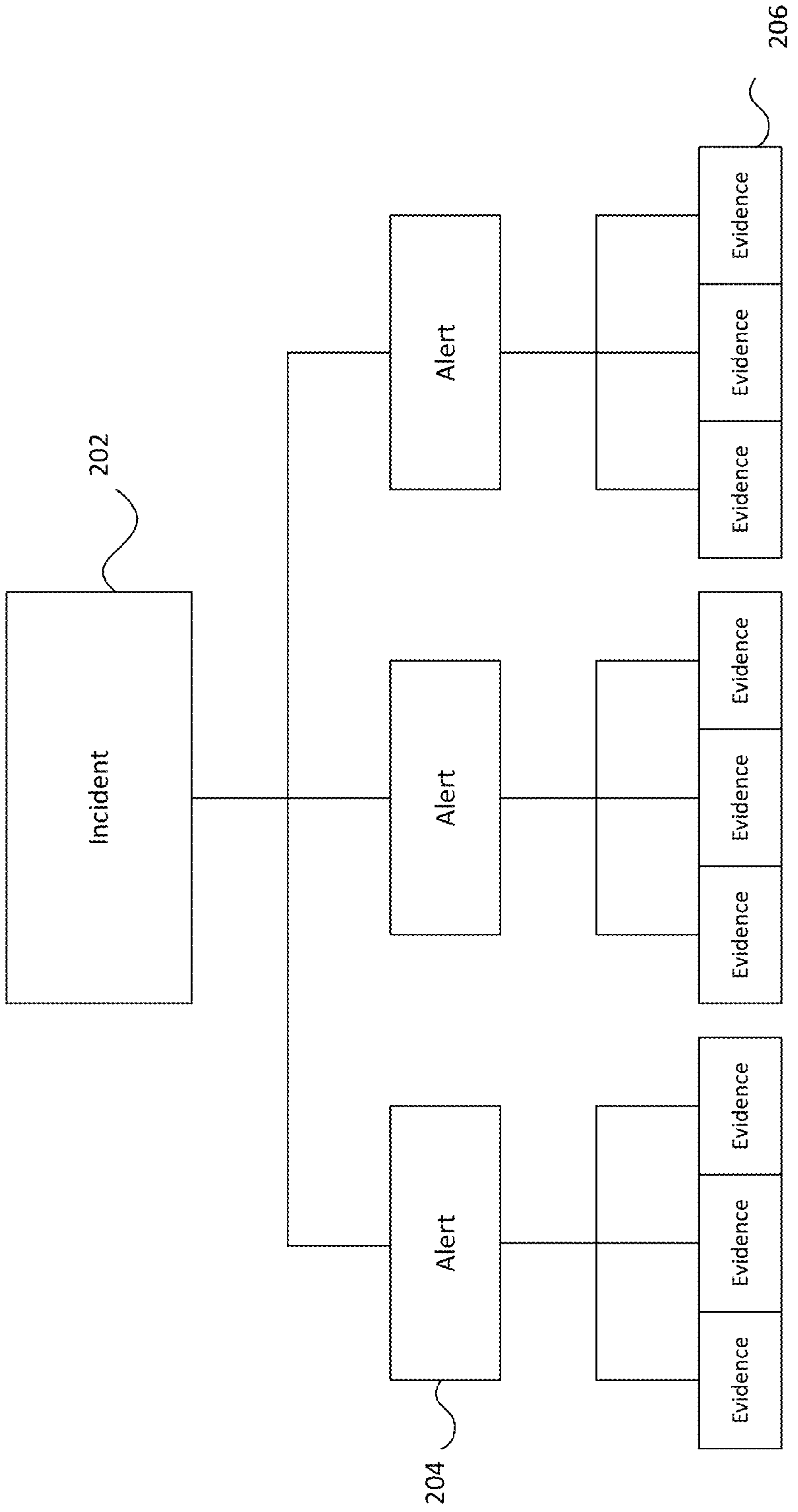
FIG. 2 is a schematic block diagram of a hierarchy of entities of a security operations center (SOC)

FIG. 2 shows an example hierarchical data structure for security alerts processed as part of a security operations center (SOC). SOCs employ analysts who monitor security alerts collected by the SOC from various sources on the computer network, review the alerts to determine if a genuine threat is present, and take action to mitigate potential threats.

The data of the security information of the SOC is arranged into a hierarchy of incidents, alerts and evidence. An incident 202 sits at the top of the hierarchy and can be characterised as a group of related alerts that the system has identified as bring related. The data of an incident may include a list of related alerts, as well as associated data such as a summary of the alerts associated with the incidents and/or any applications, users or devices affected by the incident, times that the incident occurred, a severity of the incident, etc. Each alert 204 contains a list of evidence 206 associated with the alert, as well as other associated data and metadata, such as identifiers for users, devices associated with the alert, rules that triggered the alert, etc. Evidence 206 can comprise information such as IP addresses, user IDs, files and processes. The data at each level of the hierarchy can be loaded into a dataframe, which is a data structure that organises the data of each entity (evidence, alert or incident) into columns.

Figure 3:
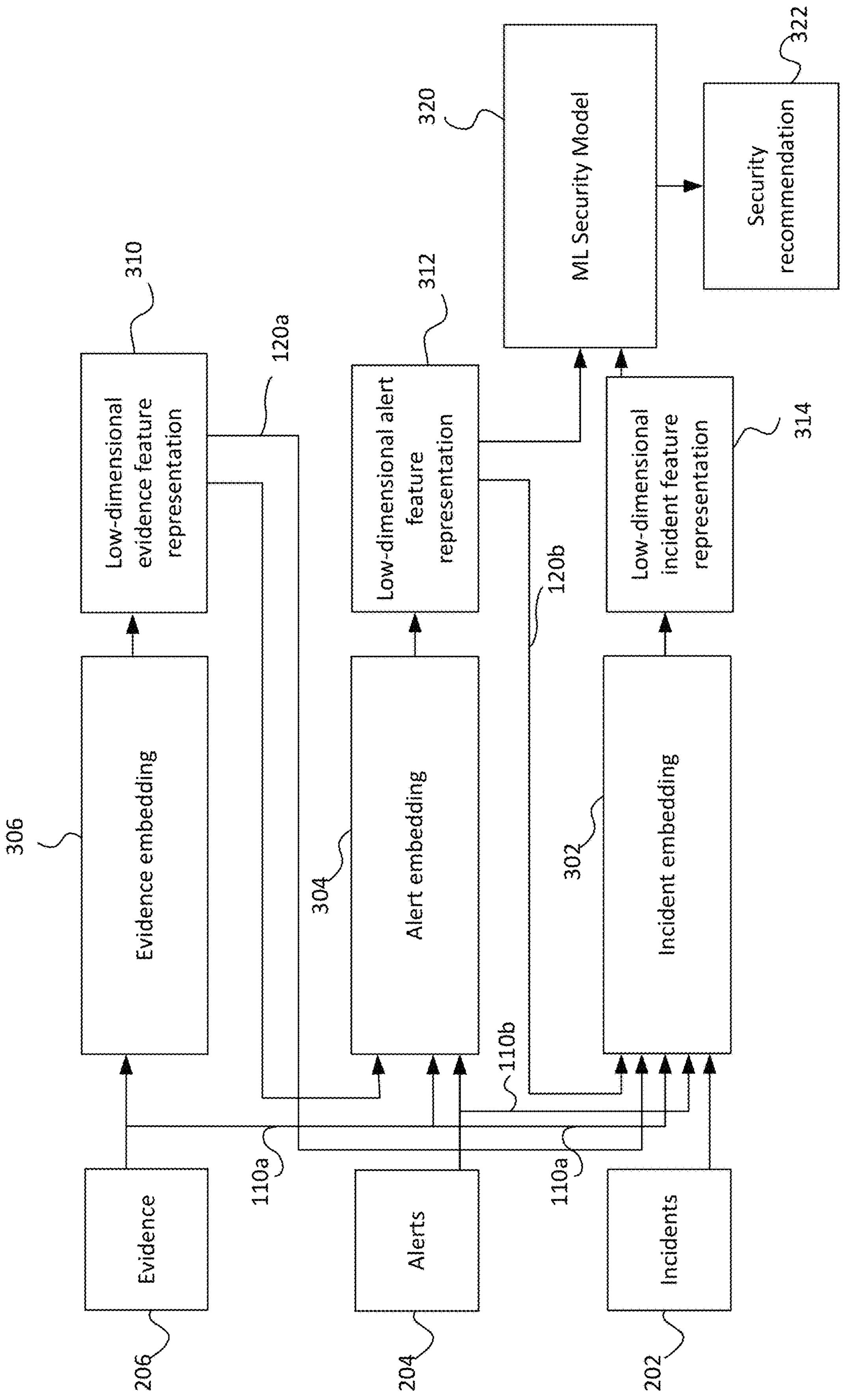
FIG. 3 is a schematic block diagram of a security model using hierarchical representation learning.

FIG. 3 shows an implementation of the hierarchical representation model for the data hierarchy shown in FIG. 2. The hierarchical representation model is composed of three levels: one for each level of the hierarchy. The model generates a low-dimensional numerical representation for each of the evidences, alerts and incidents generated at an SOC. As described above for the two-level hierarchy of FIG. 1, the first level takes in the data input for the first level entity, which in this case is an evidence. Evidence data can comprise emails, process data, application data, etc. that relate to alerts on the computer network being monitored, as well as associated metadata.

Figure 4:
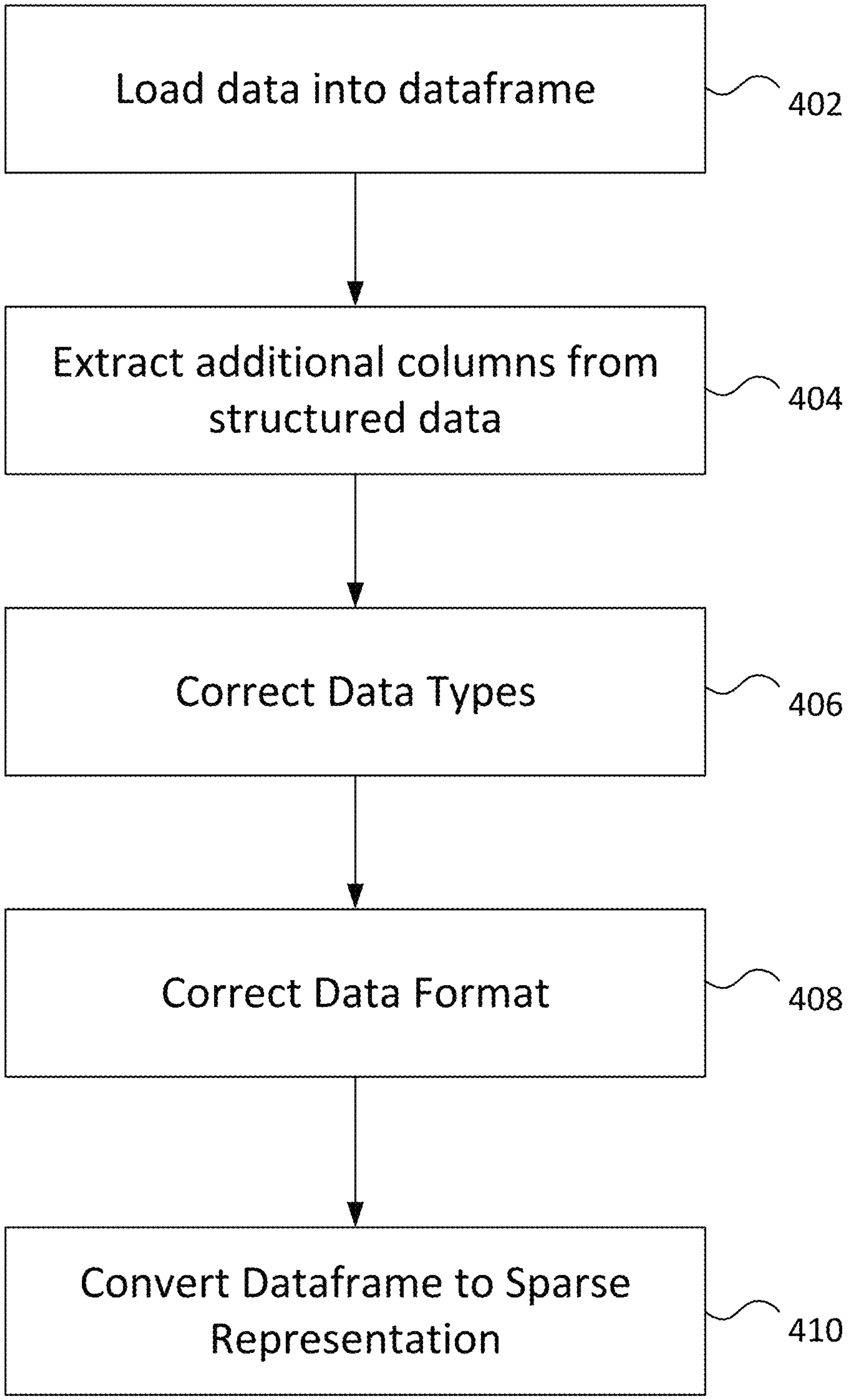
FIG. 4 is a flow diagram of a method for pre-processing data for a hierarchical representation learning model.

The evidence data 206 received by the hierarchical model may be provided in a standard format created in pre-processing, for example according to the steps described in FIG. 4. In the present example, the evidence is received in the form of a dataframe having a set of columns, with each column having a predefined data type (e.g. numerical, categorical or textual data). This is provided to an evidence embedding component 306, which processes the data of the non-numerical columns according to one or more predefined embedding models, examples of which are described in further detail below. The resulting numerical representations are combined with the numerical columns to generate an overall numerical representation of the evidence, and further processing is applied to reduce this representation to a low-dimensional embedding 310. This low-dimensional evidence embedding (or feature representation) is a numerical vector having a lower dimension than the input evidence. For example, the evidence embedding component may be configured to output feature vectors having 256 features. The size of the low-dimensional feature representation may be determined according to the resources available to the computer system on which the model is implemented, as well as the application.

The alert data 204 is provided to the alert embedding component 304 of the hierarchical system as a dataframe having columns of different data types. However, at this second level, the evidence input 206 is also provided as input to the alert embedding component 304. All evidence inputs 206 corresponding to a given alert 204 are provided to the alert embedding component 304, so as to process the alert data with the input data of all the evidence associated with that alert. The evidence data 206 is provided via a residual or 'skip' connection 110*a*, since the evidence input 206 'skips' the processing of the first level evidence embedding and is provided directly to the alert embedding level. The low-dimensional evidence feature representation 310 is also provided to the alert embedding component 304 as a hierarchical connection 120*a*. It should be noted that, while the evidence input 206 and the evidence embedding 310 are both provided as inputs to the alert embedding, they are incorporated into the alert embedding at different stages, as described in further detail below, with reference to FIG. 6. The alert embedding component 304 comprises one or more sub-components to convert all non-numerical data to a numerical representation, combine the numerical representations of all inputs, and reduce the dimensionality of the resulting representation to generate a low-dimensional alert feature representation 312. As described in more detail below, the alert embedding component may also apply a conversion of an initial numerical representation of the alert to a sparse representation, which consumes less memory and compute resources for storage and processing.

The low-dimensional alert feature representation 312 can be provided directly to a downstream machine learning security model 320 configured to process alert data in the form of a numerical vector and to generate one or more security classification outputs (also referred to herein as security recommendations) based on its processing of the given alert. In the example implementation described herein, the machine learning model 320 is a multi-task multi-class machine learning model configured to perform various security analysis tasks and provide security recommendations of various types which can be provided to a user or to a further application, such as a cybersecurity application, in order to take mitigating actions. This multi-task model is also configured to take inputs at different levels of the hierarchy, i.e. both incidents and alerts, which are represented in the same low-dimensional numerical format by the hierarchical representation model.

At the incident level, incident data 202 is provided directly to the incident embedding model 302. Incidents may be provided in the form of a graph. As shown in FIG. 2, incidents can be associated with multiple alerts, each of which is in turn associated with multiple ‘evidences’ (i.e. evidence entities/objects). Other metadata may also be provided at the incident level. The incident embedding component 302 receives the alert input data 204 directly via a skip connection 110*b*, with alert data for each alert associated with the given incident 202 being processed. As described in further detail below, the processing is applied according to the hierarchy, with the alerts 204 being joined to the incident 202 first, before joining the evidence 206 as provided via the skip connection 110*a* for the alerts already combined with the given incident. The combination of the input data and the conversion to a numerical format is described in more detail with reference to FIG. 7. The embeddings 312 for each of the alerts associated with the incident is also provided to the incident embedding component 302 via hierarchical connection 120*b*, to combine the incident embedding based on the inputs at all levels with the alert embeddings 312. The embeddings 310 for each of the evidences associated with the alerts is provided to the incident embedding component 302 via the hierarchical connection 120*a*, and combined with the representation of incidents and alerts. Finally, an overall dimensionality reduction is applied to convert the combined representation to a low-dimensional incident feature representation 314. In the present implementation, each of the embeddings 310, 312, 314 for the evidences, alerts and incidents, respectively, are numerical vectors having 256 elements. However, the size of the representation may be chosen according to the given application and/or the computer system on which the model is implemented.

The low-dimensional embedding 314 of the incident can be provided to the machine learning security model 320, which is configured to perform one or more tasks in order to provide a security recommendation 322 in relation to the incident. As mentioned above, the ML model is configured to process different inputs including alerts and incidents, and to perform different tasks in relation to those inputs. An example multi-task network is described in more detail with reference to FIG. 9.

FIG. 4 shows a set of pre-processing steps carried out on the raw evidence, alerts and incidents data to provide the data to the hierarchical model described above in a suitable format for processing. At step 402, the relevant data (i.e. evidence data, alerts data or incidents data as generated by a security monitoring system or other application on a monitored computer network) is loaded into a dataframe, which is a data structure having multiple columns, each column having data of a specific data type. The dataframe has an adaptive schema, such that new features can be incorporated into the dataframe as the security data changes over time. Some of the input data may be provided as a text string that defines a JSON object which could include any additional data nor already provided in the form of text, or categorical or numerical data. While a string of text is unstructured, the JSON object defined by the given text is structured data having its own columns and values. Therefore, at step 404, any JSON text is parsed and the additional columns are extracted from the JSON string. After the first two steps, some data may be in the ‘wrong’ data type. For example, some numerical data may be provided in the form of a text string of numbers. At step 406, the data is processed to correct the data type of all the columns such that each column contains data of the appropriate type.

At step 408, the format of any data which is incorrectly formatted is corrected. This could include, for example, date formatting, in which dates are standardized to a single format, and text cleaning, to remove punctuation, and to convert all text to upper or lowercase, etc. The resulting dataframe is then a set of columns with consistent data types and formatting, with each column corresponding to an attribute of the underlying evidence, alert or incident. However, such a representation can contain a lot of redundancy, for example, where a given field is present in some alerts but not all, this column might contain mostly zeros. This can take up excessive memory when storing and processing the data inputs. At step 410, the dataframe is converted to a sparse representation storage format to reduce the memory resources required to store and process the resulting input in the hierarchical representation model. Note that, as described below, further processing by the hierarchical model can result in less efficient representations, requiring later representations to be again converted to a sparse representation storage format to ensure efficiency throughout processing.

Figure 5:
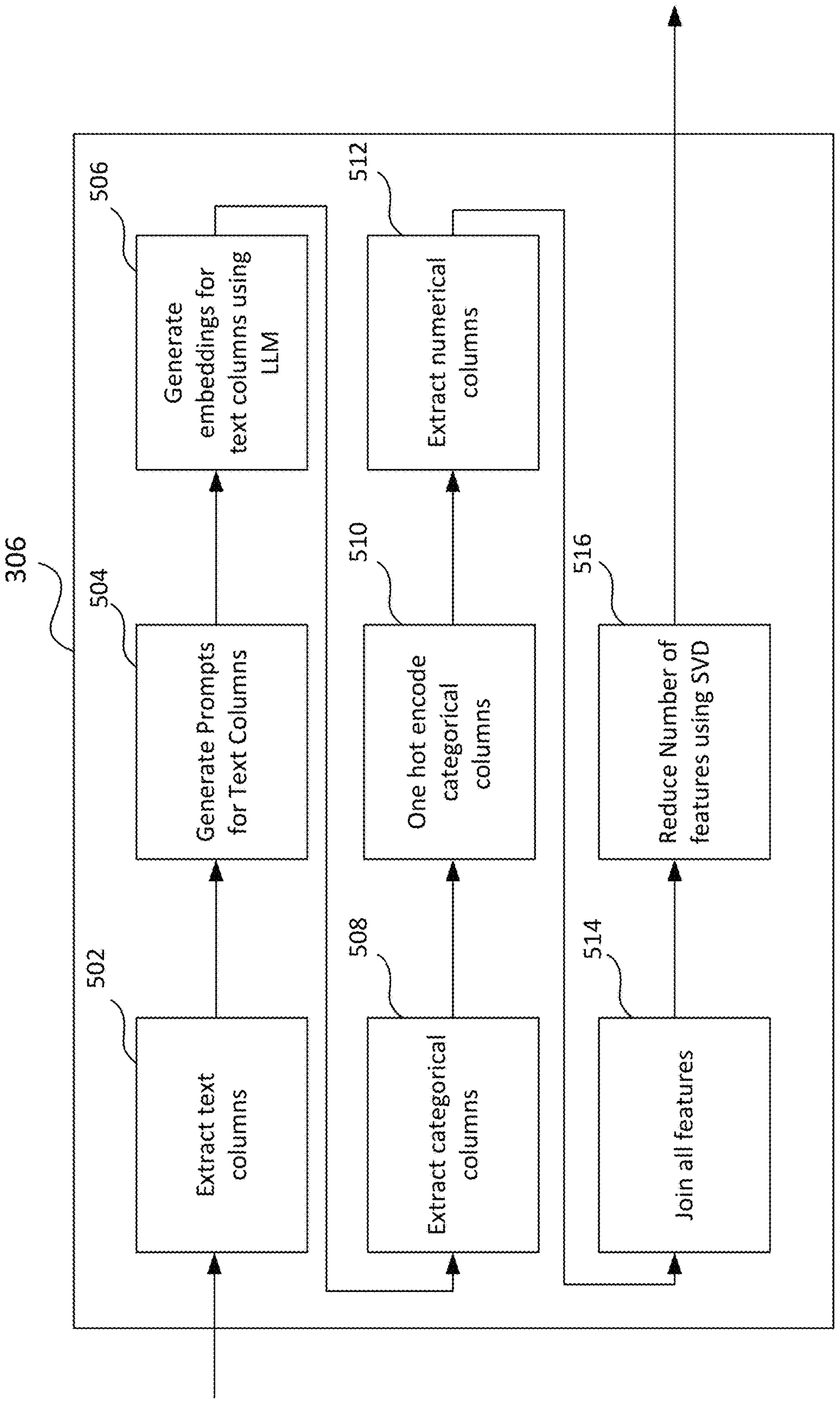
FIG. 5 is a schematic block diagram showing the generation of an evidence embedding.

FIG. 5 shows a more detailed example implementation of the evidence embedding component 306 for generating embeddings at the first level of the hierarchy shown in FIG. 2. Each evidence 206 is provided as a sparse representation, after pre-processing of an initial evidence data object according to the steps described in FIG. 4. As mentioned above, the columns of the evidence dataframe can have different corresponding data types, including textual data, categorical data and numerical data. The aim of the representation model is to generate a numerical vector representation of each evidence 206. At step 502, the text columns are extracted from the evidence 206. These are then processed at step 504 in order to generate prompts for a large language model (LLM), which can be used to generate embeddings of the text columns at step 506. The prompts are generated by extracting the column name and the values of the column, with each column and value pair being provided as input to the LLM at step 506, where the LLM processes the text input to generate a numerical embedding of the text in each text column.

Figure 6:
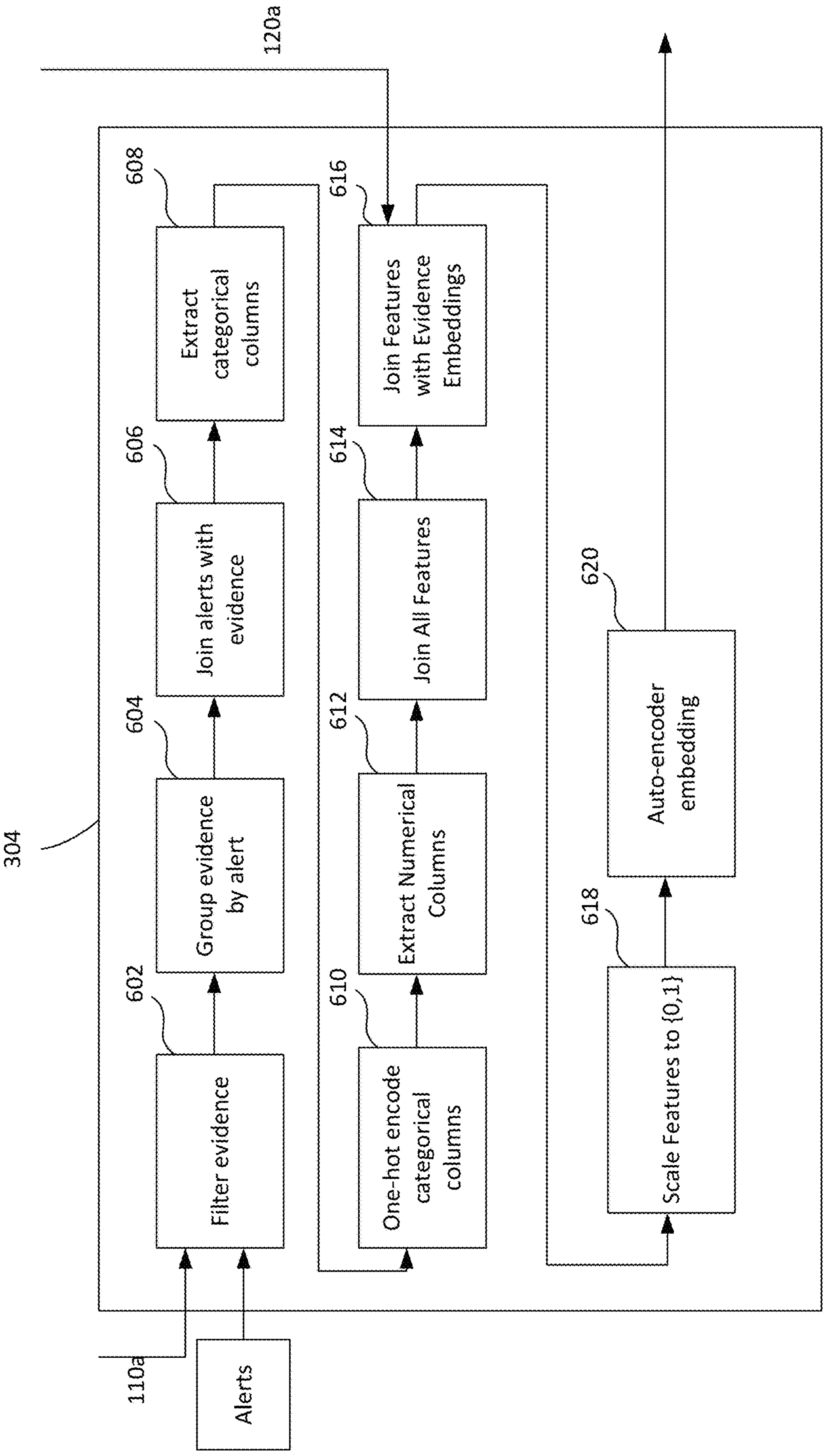
FIG. 6 is a schematic block diagram showing the generation of an alert embedding.

At step 508, the categorical columns are extracted from the evidence input, and at step 510 a one-hot encoding is generated for each of the categorical columns. A one-hot encoding is a method of converting categorical data to numerical data by creating a vector having an element for each member of the category in question, and assigning a one (or other numerical value) to the element corresponding to the given category, and a zero to all other elements of the vector. This results in a high-dimensional, sparse numerical representation of the categorical data. Finally, the numerical columns are extracted at step 512. Each of the text data, the categorical data and the numerical data are now represented in the form of numerical arrays. These are then combined at step 514 by joining the numerical arrays into a combined numerical representation of the evidence. However, this representation still has a large dimension. At step 516, the combined numerical representation is reduced to a lower-dimensional numerical representation using a dimensionality reduction method, such as singular value decomposition (SVD). The skilled person will appreciate that SVD is just one of many possible techniques for reducing the dimensionality of a numerical array and that other suitable dimensionality reduction methods may be used in this step instead. The resulting feature representation provides a low-dimensional embedding of the input evidence. FIG. 6 shows a more detailed example implementation of the alert embedding component 304 for generating a low-dimensional numerical feature representation 312 for alerts of the SOC. The alerts 204 are provided to the alert embedding component 304, along with the evidences 206 which are provided via the skip connection 110*a*. The alerts are provided in a sparse storage format after pre-processing according to the method of FIG. 4. At step 602, the evidence is filtered to only include the most prevalent types of evidence (i.e. evidence entities which are less prevalent are removed from the data). This step is performed to reduce the amount of evidence data to be processed for each alert to generate alert embeddings. At step 604, the evidence 206 is grouped by alert, to associate each alert 204 with its respective evidence. The alerts are then joined to the evidence at step 606. Note that, as for the evidence above, the alert data is provided as a dataframe having columns of different data types. Although not shown in FIG. 6, any non-categorical text data (such as custom text fields) are converted to a numerical format using an LLM or other machine learning model configured to generate a numerical representation from a text input.

At step 608, the categorical columns are extracted from the combined alerts-evidence dataframe, and a one hot encoding is performed (610) to convert the categorical data to a numerical representation. The numerical columns are then extracted (612), and the numerical features corresponding to all the original columns of the combined alerts and evidences are joined at step 614. Once a combined numerical representation of the inputs is generated, the resulting embedding is combined with the evidence embedding 310 provided to the alert embedding 304 along a hierarchical connection 120*a*, by joining the features of the two embeddings (616). The resulting features can take a wide range of values, which can cause performance issues in processing. At step 618, the features are scaled to take on values between 0 and 1. Finally, in order to reduce the size of the combined representation, an autoencoder embedding 620 is applied, which is configured to take a high-dimensional numerical input and generate a low-dimensional embedding of the input that preserves important information from the input. The autoencoder in the present example used to generate low-dimensional embeddings for alerts is an adversarial autoencoder, which is trained based on a reconstruction loss, which assesses the ability to reconstruct the original input from the representative embedding, as well as a discriminative loss, which evaluates the ability to fool a separate classifier network to detect whether the reconstructed input is real or reconstructed.

Figure 7:
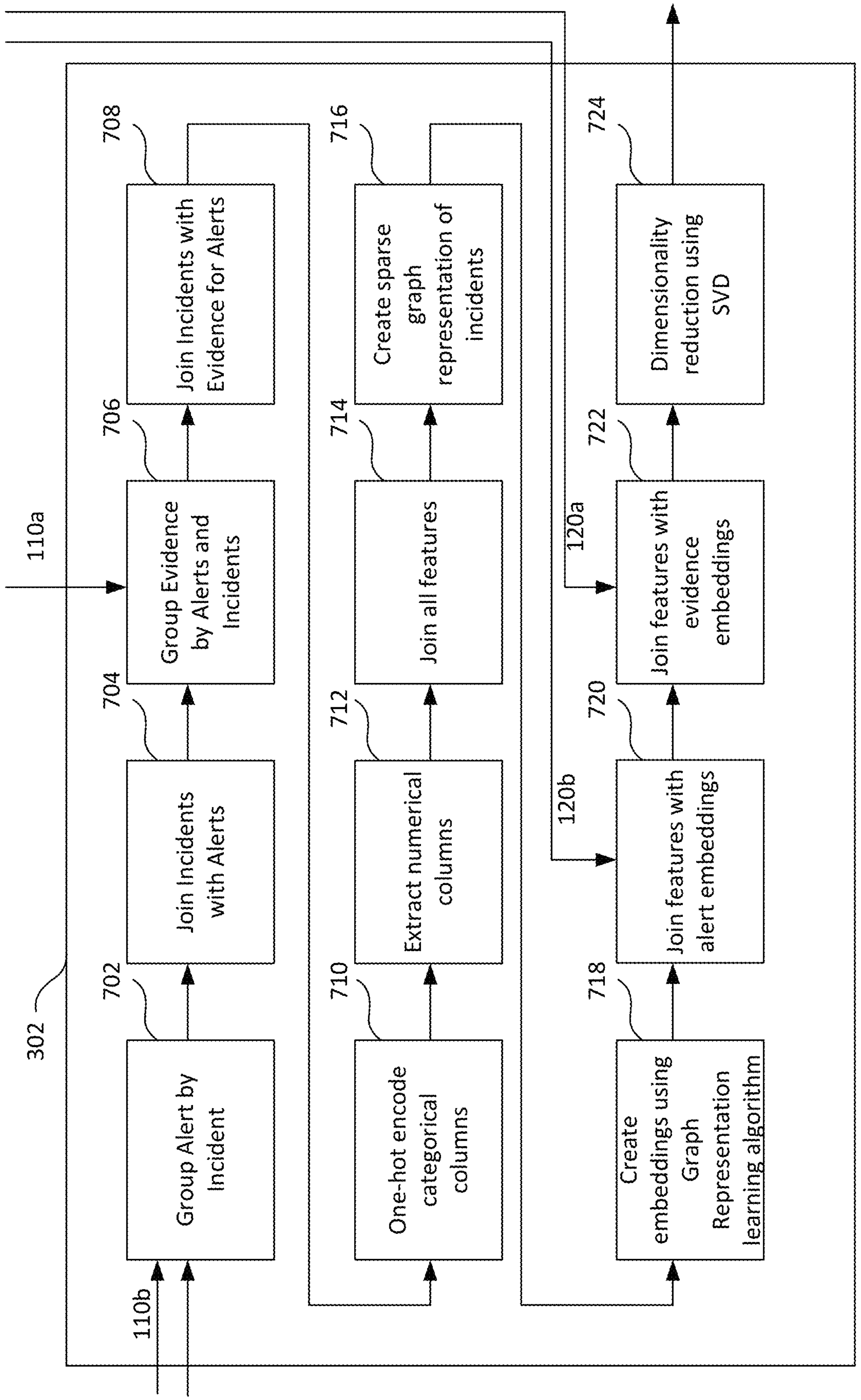
FIG. 7 is a schematic block diagram showing the generation of an incident embedding.

FIG. 7 shows a more detailed example implementation of the incident embedding component 302 for generating a low-dimensional numerical feature representation 312 for incidents of the SOC. The incidents 202 are provided to the incident embedding component 302, along with the alerts 204, which are provided via the skip connection 110*b*. At step 702, the alerts are grouped by incident so that the set of alerts associated with each incident can be joined with the incident in step 704, resulting in a combined input representation for the alerts and incidents. The evidences 206 which are received via the skip connection 110*a* are grouped by alert and incident, and then joined with the existing incident-alert combined input at step 708. As for the alert and evidence embeddings described above, the combined incident-alert-evidence inputs are processed to extract the categorical columns and apply one-hot encoding (step 710), before extracting the numerical columns (step 712) and joining all numerical features for the different column types at step 714, resulting in a single numerical representation of the incidents, also incorporating the alert and evidence input data. At step 716, the single numerical representation is converted to a sparse graph representation of the incidents. For example, where the graph is initially represented as an adjacency matrix, with every possible connection between nodes represented as 0 (doesn't exist), or 1 (does exist), this can be converted to a more memory efficient representations such as adjacency lists or sparse matrices, where the non-existent connections (i.e. zeros) are not stored. A graph representation learning algorithm is applied at step 718 to convert the numerical representation of the incidents to a low-dimensional representation. The graph representation algorithm uses characteristic functions of random walks on graphs to identify novel embeddings for individual incident graphs. The algorithm learns embeddings that preserves similarity between nodes. The graph representation learning applied at this step is based on a graph representation algorithm that can be applied to generate numerical vector embeddings for graph inputs without attribute information using the structural properties of each node (i.e. node degree). However, in the present context, each node of the graph comprises more than just structural properties, and includes associated metadata.

Figure 8:
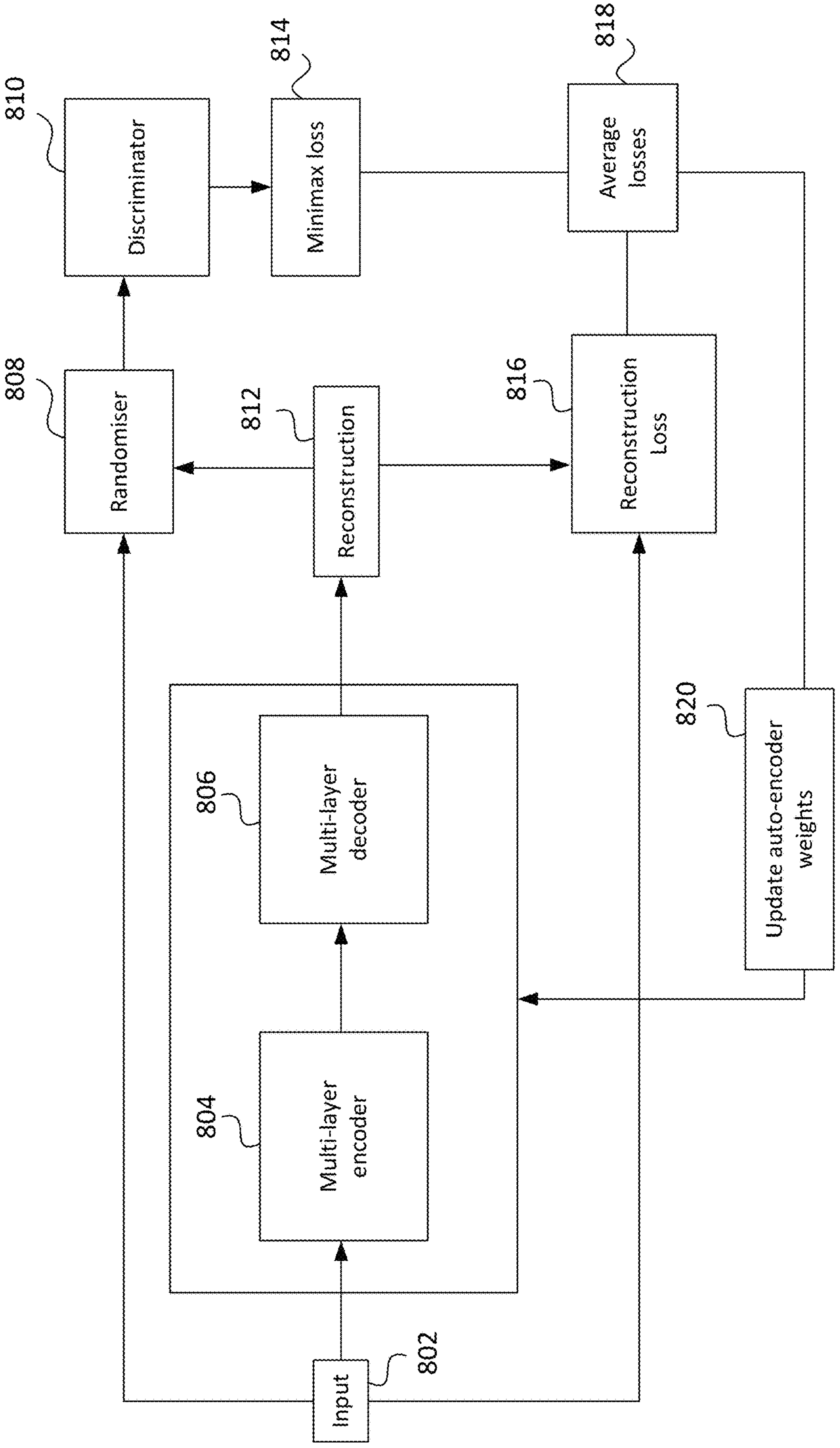
FIG. 8 is a schematic block diagram showing the training of an adversarial autoencoder.

Note that, while shown in FIG. 8 and described above for generating representations for incidents in a security application, this graph representation learning algorithm could be used to learn efficient representations of entities of a variety of hierarchical systems which are representable as a graph, such as manufacturing systems, transportation networks, etc.

Once an embedding has been generated, this is joined with the alert embeddings 314, which are received via the hierarchical connection 120*b* (step 720), and then joined with the evidence embeddings 306 received via the hierarchical connection 120*a* (step 722). Finally, a dimensionality reduction technique is applied to reduce the size of the numerical feature representation to the appropriate dimension (for example, a vector of 256 features) (step 724). In the present example, the hierarchical model is configured such that the size of the embedded vector is the same for each level of the hierarchy, i.e. each of the evidences, alerts, and incidents are represented as 256-dimensional feature vectors. However, in alternative embodiments, differently-sized feature vectors could be generated at each level of the hierarchy. The size of the embeddings can be chosen to balance computational efficiency and accuracy. Smaller vectors require less memory and compute power to store and process, but a certain number of features are necessary to capture enough information from the input. This can be chosen according to the given application.

The hierarchical system described in FIGS. 3-7 relates to a three-level security hierarchy, though it should be noted that the concept of applying residual and hierarchical connections between levels of a hierarchy in order to learn a robust representation of the hierarchy can be extended to hierarchies of arbitrary size. For higher levels of the hierarchy, a skip connection and a hierarchical connection can be provided by the associated entities at each lower level of the hierarchy. Alternatively, only a subset of the lower levels may be selected to provide inputs to a higher level via skip connections and hierarchical connections, for example, by only providing connections to the three next-highest levels of the hierarchy.

The hierarchical security representation model described with reference to FIGS. 2-7 is just one possible application in which a hierarchical representation can be useful. Other possible systems for which hierarchical data analysis is performed include the following:

a. Transportation networks—One example is the electrical grid, which consists of power stations, substations, transmission lines, and distribution networks. A power station can generate electricity that is sent to multiple substations, and each substation can step up or down the voltage for multiple transmission lines, which then distribute the power to individual customers. A hierarchical representation model can be used to represent data relating to each of the stations, substations, transmission lines, etc., where this representation could be provided as input to a machine learning model configured to predict electricity needs and enable a user or computer system to take action to ensure that electricity is transmitted efficiently.

b. Systems biology—In the field of biological sciences, a similar hierarchical structure can be seen with genomics, proteomics, and metabolomics. A genome can have multiple genes associated with it (genomics), each gene can produce multiple proteins (proteomics), and in turn, each protein can be involved in multiple metabolic reactions producing various metabolites (metabolomics). A hierarchical representation model can be used to represent a set of genes and their associated proteins and metabolites. This may be used by a machine learning model configured to identify patterns in genomic data.

c. Operating systems—In the context of an operating system, a similar hierarchical structure can be seen with operating systems, processes, and threads. An operating system can have multiple processes running on it, and each process can have multiple threads associated with it. A hierarchical representation model can be used to represent the operating system, providing a suitable input representation for a machine learning model to analyse the activity of the operating system, for example to better manage compute resources.

d. Networking—In the context of computer networks, a similar hierarchical structure can be seen with networks, devices, and packets. A computer network can have multiple devices connected to it, and each device can send or receive multiple packets of data. A more comprehensive example could also be the complete networking stack (e.g. the OSI model), which consists of 7 hierarchical layers: Physical layer, Data Link layer, Network layer, Transport layer, Session layer, Presentation layer and Application layer). A hierarchical representation model can be used to represent a computer networking stack consisting of all 7 layers, or a subset of layers within the stack, in order to provide an input to a machine learning model, or multiple machine learning models, configured to perform a wide variety of tasks relating to the network.

e. In the context of web development, a similar hierarchical structure can be seen with websites, web pages, and HTML tags. A website can have multiple web pages associated with it, and each web page can contain multiple HTML tags. A hierarchical representation model can be used in this case to represent the website, which can be used by machine learning tools, for example to suggest and/or implement improvements to the website.

FIG. 8 shows a schematic block diagram of an adversarial autoencoder. In the example hierarchical representation model described above, the adversarial autoencoder is used by the alert embedding component 304 in step 620 to generate a low-dimensional embedding for alerts, although it can be used at any level of a hierarchical representation learning model to convert a high-dimensional numerical feature vector into a lower-dimensional feature vector. Autoencoders comprise an encoder and a decoder, with the encoder generating a low-dimensional representation of an input, and the decoder configured to reconstruct the input in its original form. The parameters of a typical auto-encoder model are trained using gradient-descent methods to minimise a reconstruction loss, which measures a difference between the input and the reconstruction generated by the decoder based on the encoder output. The principle of training the autoencoder to minimise the reconstruction loss is that the encoder learns to generate a low-dimensional encoder that captures sufficient information from the input to reconstruct the full input well. However, in the examples shown and described herein, an extension to a standard autoencoder is used, which additionally trains the parameters of the autoencoder so as to jointly minimise a reconstruction loss and a second adversarial loss. This version of the autoencoder is referred to as an adversarial autoencoder. Note that, while described above for generating representations for alerts in a security application, an adversarial auto-encoder could be used to learn efficient representations of entities of a variety of hierarchical systems, such as manufacturing systems, transportation networks, etc.

As shown in FIG. 8, an input 802 is provided to the autoencoder. The input is typically in the form of a numerical vector or matrix. In the present example, the input is a numerical vector having dimension N. The input 802 is passed to an encoder 804, which has a multi-layer neural network architecture. The input 802 is processed sequentially by the layers of the encoder 804, each of which generates an intermediate vector. The layers are configured to generate a vector of reduced dimension L<N. In training, a multi-layer decoder 806 is applied to the low-dimension vector to generate a reconstructed vector 812 having the same dimension N as the input. This is provided to a reconstruction loss function 816, which computes a measure of difference between the reconstructed vector and the input vector.

An example reconstruction loss is defined as follows:

$$L = \sum_{x\ in\ X} (x^k - x^k_{rec})^{\frac{1}{k}},$$

where k is a constant, x is a single input vector of the set X of all input data, and $x_{rec}$ is the reconstructed vector. However, it should be noted that other distance metrics could be used.

The output of the encoder-decoder model is also provided to a discriminator model 810 which has been trained to distinguish a real input from a reconstructed input. As shown in FIG. 8, a randomiser 808 is first used to select a subset of the given inputs and reconstructed inputs to feed to the discriminator 810. The discriminator model takes each randomly selected pair of real and reconstructed inputs and computes a predicted probability that each input is a real input. A minimax loss function 814 is used to evaluate the accuracy of the discriminator model 810, therefore evaluating the ability of the encoder-decoder model to generate convincing reconstructions of the input. The minimax loss function 814 can be defined as follows:

$$L = \sum_{x\ in\ X} (\log D(x) + \log(1 - D(A(x))),$$

where x is the input, A(x) is the reconstruction of the input, X is the set of inputs generated by the randomiser 808, D(x) is the discriminator's estimate of the probability that the real input x is real, and D(A(x)) is the discriminator's estimate of the probability that the reconstructed instance is real. The auto-encoder may be considered an 'adversarial' autoencoder due to the use of a discriminator with a goal of distinguishing between real and reconstructed inputs, while the encoder-decoder model has the competing goal of generating convincing reconstructed inputs. Both models are trained to improve at their respective tasks until some equilibrium is reached.

A weighted average 818 of the two losses can be defined, based on which a gradient-descent based method can be used to compute an update 820 for the parameters of the encoder-decoder model. This can be performed iteratively until some training condition is met. The principle behind this training is that a low-dimensional representation that represents an input sufficiently well that it can be accurately reconstructed is a useful representation of that input for other downstream tasks. The parameters of the discriminator model may also be updated so as to maximise the minimax loss function, to improve the predictions of the discriminator 810.

At inference, only the encoder 804 of the adversarial autoencoder is used. The encoder takes in a high-dimensional input, such as the numerical representation of an alert, formed by joining numerical representations of the text columns, categorical columns and numerical columns of the alert dataframe. The output is a low-dimensional numerical representation of the input data that captures sufficient information of the input data to generate an accurate reconstruction.

The numerical representations generated by the hierarchical models described above with reference to FIGS. 1-8 provide a computationally-efficient and accurate representation of hierarchical data which can be used by further models configured to perform downstream tasks. The representations can be used directly to identify similar entities for a given input entity, by applying a similarity measure, such as cosine similarity, to pairs of representation vectors representing the input entity and a candidate entity for which similarity is being assessed. This use of a similarity measure may be referred to herein as a 'similarity model'. In the context of a security application, such a similarity model can be used for the tasks of suggesting similar alerts to the input alert, or suggesting similar incidents to the input incident. These similar suggestions can be used to (a) identify similar alerts/incidents to investigate next, or (b) look at historical alerts/incidents to figure out how to better investigate the current one. In either case, cosine similarity (or some other similarity metric, such as a distance measure), is computed between the low-dimensional representation of the input and a set of historical embeddings representing the historical alerts/incidents, or a set of embeddings representing the not-yet-investigated alerts/incidents. A list of the top k most similar embeddings to the input is taken (where k is a constant which can be defined according to the given use case) and presented in a user interface to provide those alerts/incidents to the user.

The same process can be applied to any given application. For example, in a design/manufacturing context, a given design input can be compared with historical or future design inputs to enable a similar approach or manufacturing configuration to be used for similar inputs. In the context of an electricity grid, individual customers or substations that are determined to have similar usage patterns, resulting in similar low-dimensional representations in the hierarchical model described above, may be treated similarly by providing similar amounts of power at similar times.

In addition to similarity between representations, further machine learning models can be applied to the low-dimensional representation generated at each level of the hierarchy according to the model described above to perform specific tasks relating to the entities at each level. As described in further detail below, a single machine learning model can be simultaneously trained to perform multiple tasks as applicable to the given input. Alternatively or additionally, individual models can be trained for each level of the hierarchy in order to perform tasks for that specific level of the hierarchy. For example, in a security context, a separate model could be trained for each of the following example tasks:

- predicting the activity of a SOC analyst
- suggesting features or tools for the SOC analyst to use
- prioritising incidents or alerts where each model may be trained on representations from one or multiple levels of the hierarchy.

As noted above, a particular advantage of the hierarchical model described herein is that, irrespective of the format of the input at each level, the model is configurable to compute a feature representation taking the same form at each level of the hierarchy. For example, in the case of a security application having a hierarchy of evidences, alerts, and incidents, each evidence feature vector has length 256, each alert vector has length 256 and each incident vector has length 256. This enables training of a general machine learning model configured to process any output of the hierarchical representation learning model and process the respective output to complete a given task.

In the security example, there are a number of tasks that may be performed by a machine learning model to make a security recommendation in relation to an alert and/or an incident. As one example task, a user (e.g. a security analyst) may be interested in seeing other alerts or incidents that are related to, or similar to, a current alert or incident being analysed. This can help the analyst to prioritise which alerts or incidents are investigated first, reducing the fatigue associated with a large influx of alerts and incidents. Another possible task that could be performed automatically by a trained machine learning model is the grading of alerts and/or incidents as false positive, true positive or benign positive incidents, where 'benign positive' herein refers to alerts and/or incidents that have been raised due to a valid security concern, but where the underlying activity is benign. For example, a security alert may be raised when a malicious process is run, but it may be classed as 'benign positive' when it is determined that the process was run in the context of a security test. The model may predict a grade for each alert or incident, which could be provided to the user in a user interface, enabling the user to sort alerts or incidents by grade, thus prioritising the most important alerts and incidents.

Figure 9:
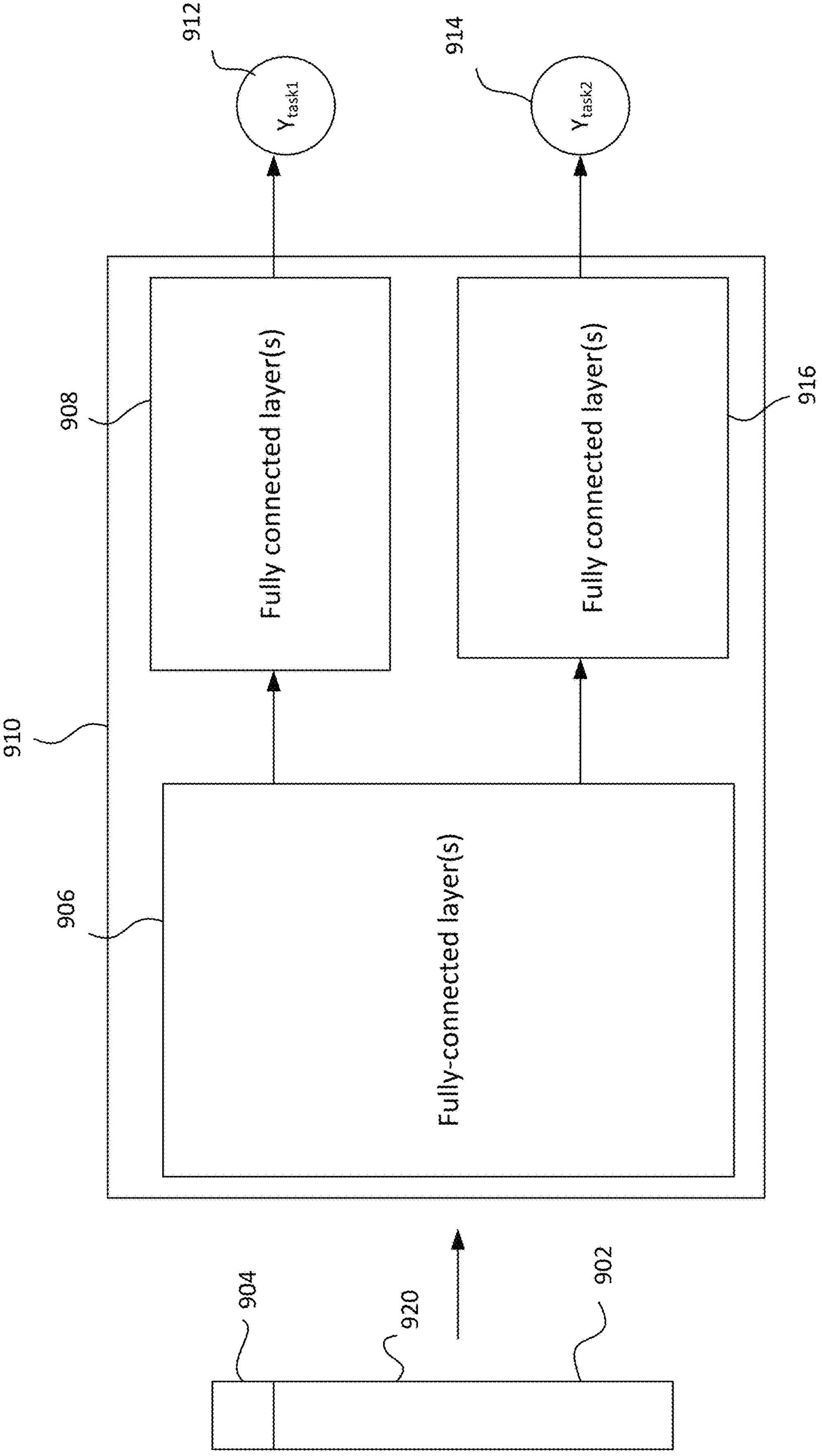
FIG. 9 is a schematic block diagram of a multi-task machine learning model.

FIG. 9 shows a schematic block diagram for a multi-task machine learning model configured to perform two tasks on a given input in the form of a low-dimensional representation generated by a hierarchical representation model. In the example shown, the input comprises a feature vector 902 of a pre-determined size, and one indicator value 904, which indicates the level of the hierarchy that the given input is associated with. This enables the machine learning model to determine which tasks to perform, and to 'switch off' tasks that do not relate to the corresponding entity represented by the input. For example, a feature representation for an alert could be provided to a machine learning model configured to perform a grade prediction for alerts, as well as a grade prediction for incidents. By providing an indicator value 904, this enables the network to recognise that the input is an alert, and perform the grade prediction for alerts only, with the part of the network configured to perform grade prediction for incidents being switched off.

In the example shown in FIG. 9, the machine learning model 910 is a multi-task model configured to perform two tasks, referred to as 'Task 1' and 'Task 2'. As shown in FIG. 9, the model comprises a first set of fully connected layers 906 which is common to both tasks. A feature representation input 920 comprising the low-dimensional feature vector 902 generated by the hierarchical model, as well as an indicator value 904, is first processed by the fully-connected layers 906, generating an intermediate output which is then provided to each set of task-specific fully-connected layers 908,916. Each set of task-specific fully connected layers (also referred to herein as a task-specific sub-network) comprises its own respective set of weights which are applied to the intermediate output to generate a respective task-specific output 912,914.

In training, the model 910 is provided with a set of training example inputs for which a corresponding task-specific output exists for one of the predefined tasks. The training data may be previous data of the system to be analysed, where the outputs may be provided by a user. For example, in a security context, the inputs could comprise representations of alerts and incidents, and the corresponding outputs could be a user-assigned grade (true positive, false positive, benign positive) for the alerts and incidents. This corresponds to two different tasks of the machine learning model: predicting a grade for an alert, and predicting a grade for an incident. Each input-output pair is used to train both the common fully-connected layers 906 of the model 910, as well as the respective fully-connected layers (908, 916) of the task corresponding to the given input.

In training, the machine learning model 910 generates a predicted output for the given training input, which can then be compared with the actual training output. For classification tasks, for example, the model may compute a probability that the given input belongs to each of the possible classes. For example, for a given alert, an alert grade prediction model may output a 3-dimensional vector with three probability values corresponding to the probability that the alert is a true positive, the probability that the alert is a false positive, and the probability that the alert is a benign positive, respectively. The model is trained by defining a loss function for each task that evaluates the model's prediction against the training output, and updating the parameters of the model so as to minimise the loss. In the present example, both tasks are classification tasks, i.e. the machine learning model selects a grade from among a set of possible grades for the given input. One possible loss function that can be used to train multi-class classification models is cross-entropy loss, which is minimised when the model assigns high probability values to the correct classes and low probability to other classes. However, any other suitable loss function can be used. Each task has an associated loss function that computes the loss for the model outputs associated with that task. For each task, gradient descent can be used to update the weights of the fully-connected layers corresponding to that task by computing the gradient of the loss function associated with that task. Gradient descent methods of training are well known in the art of machine learning and will not be described in detail herein. In order to update the weights of the common fully-connected layers 906, an overall loss function is defined as a weighted sum of the loss functions for each individual task, and a gradient-descent based method is used to update the weights of the fully connected layers 906 using the gradient of the overall loss function.

As mentioned above, while FIG. 9 shows only two task-specific sub-networks (908,916), the machine learning model 910 can be trained to make predictions for any number of tasks relating to the input. In one security-based example, the machine learning model 910 comprises six task-specific networks, each configured to make a prediction in relation to a respective one of the following tasks:

- predicting alert grades for the input alert
- predicting incident grades for the input incident
- predicting alert actions for the input alert (e.g. actions that can be taken to mitigate security risk in relation to the input alert)
- predicting incident actions (e.g. actions that can be taken to mitigate security risk in relation to the input incident).

It should be noted that each task is associated with an input of a particular level of the hierarchy (i.e. alerts or incidents). The trained machine learning model 910 receives an input 920 with an indicator 904 which defines a level of the hierarchy for the input. The machine learning model uses this indicator to determine which of the task-specific set of layers are applicable to the given input, and in this case only applied the relevant sub-networks corresponding to that level of the hierarchy. In the above example, where an alert is received, the model 910 only 'activates' the task-specific sub-networks for suggesting similar alerts, predicting alert grades, and predicting alert actions. The model processes the alert input in the common set of fully-connected layers 906, generating an intermediate vector which is then passed to each of the fully-connected layers (or sets of layers) corresponding to an alert-related task. Each alert-related sub-network processes the intermediate vector to generate a different respective task-specific output in relation to the respective task of that sub-network, such as a vector of probability values for each of a set of possible classes for the given alert. The class having the highest probability may be selected and output by the model to a user via a user interface or to a further application configured to take a given action based on the predicted class.

Figure 10:
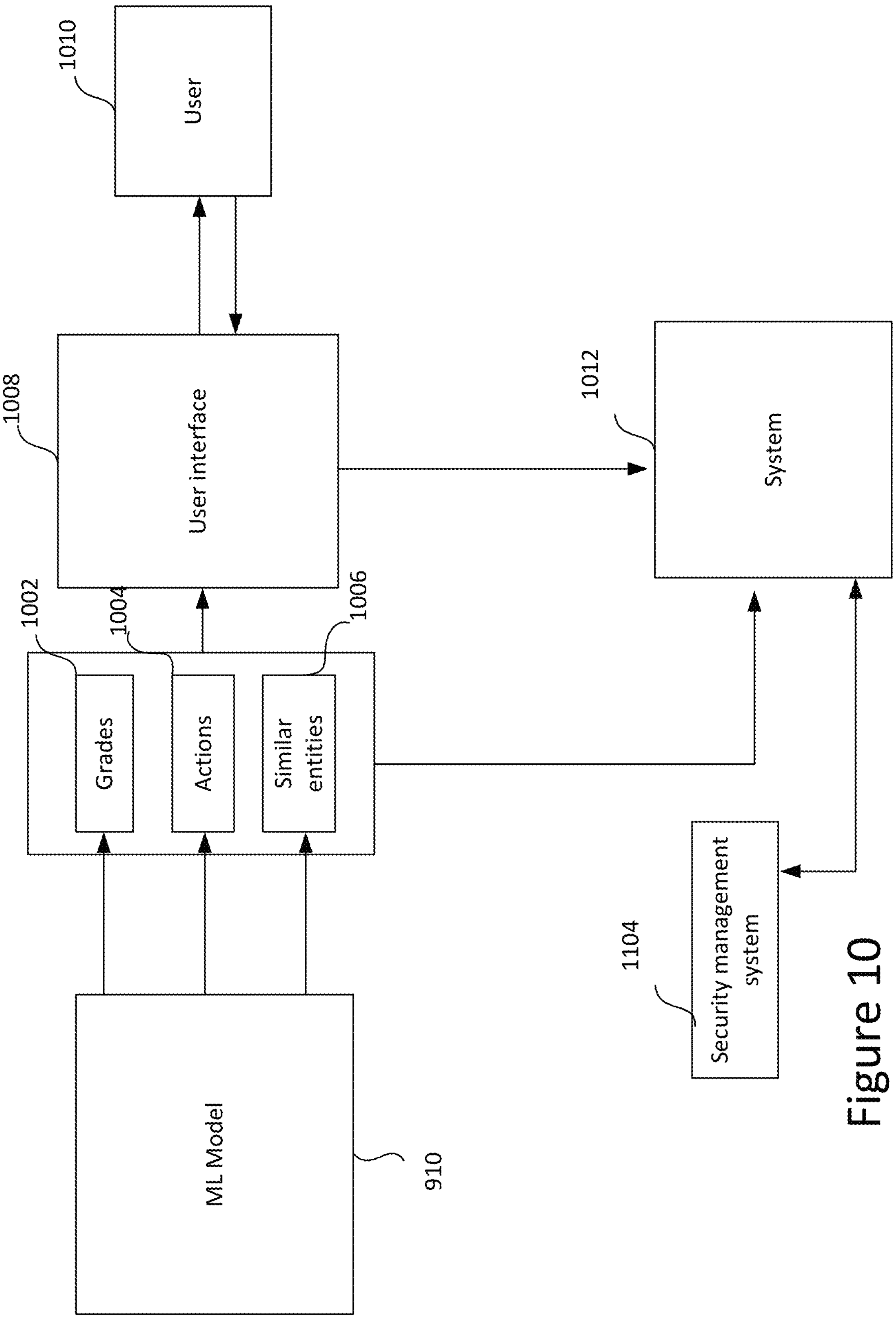
FIG. 10 shows how the output of a machine learning model can be used to control settings of a system.

FIG. 10 shows how the classification outputs generated by a machine learning model 910 for the various tasks defined for the given application can be used to perform actions within the system being monitored/analysed by the model 910. The output of the machine learning model, as described above, includes one or more predictions made by sub-networks of the model 910 associated with a given input. These predictions may be directly associated with an action to be taken in relation to the entity of the input, for example where the model predicts an action 1004 to be taken in relation to an alert, that action may be taken by a user or other application. Alternatively, an action to be taken in the computer system may be indirectly associated with the prediction. For example, where the model provides one or more alerts which are deemed as similar 1006, a user may wish to add this alert to a list of alerts to be analysed. For a predicted alert grade 1002, a possible action could be to prevent a user account associated with the alert from accessing certain resources on the computer network, for example. Note that the term 'action' is used herein includes both actions taken directly based on the output of the machine learning model 910, such as an action to automatically quarantine an email, or an action to output the given output to a user interface, as well as actions taken indirectly based on the machine learning model 910, such as a further action taken by a user based on the predicted grade of an alert as presented to the user in the user interface 1008.

In some embodiments, a security action is taken to provide the security classification output generated by the model 910 to a user interface 1008, which presents the outputs to a user 1010, such as a security analyst for a security operations centre. The user can then provide an input in response to the prediction of the model, with the user input triggering a further action to be performed on a system 1012 being monitored by a security management system 1014.

The security management system 1014 is configured to monitor activity within the system 1012 and generate alerts and incidents. Incidents, alerts and evidence form a hierarchy with incidents at a top level, alerts at an intermediate level, and evidence at a bottom level. Each top-level incident is associated with one or more intermediate-level alerts. Each intermediate-level alert is, in turn, associated with one or more low-level evidence entities. Evidence entities may include, for example, emails, processes, IP addresses or files associated with an alert. An alert may be a notification generated based on an identified threat. An incident may be a collection of alerts that have been identified as related (for example belonging to a single cyberattack). Analysts of a security system review alerts and incidents in order to take mitigating or other security actions in respect of both individual alerts and incidents as a whole.

For example, where an alert is determined to be a 'true positive' alert, the user may wish to apply restrictions to a user associated with the alert. The user interface 1008 may provide the user with one or more user controls via which the user can interact with the system being monitored. For example, the user interface 1008 may display details of the alert being processed, including the predicted grade of the alert, and any recommended actions that can be taken to address any security threat associated with the alert, and controls to perform the action in the computer system being monitored. For example, where an alert is determined to be a true positive, and a recommended action associated with the alert is to quarantine an email associated with the alert, the user interface could provide a button that the user can select to quarantine the email, where this action triggers instructions to be sent via the user interface to the system 1012 being monitored to quarantine the email. The user control may be processed by a cybersecurity application or program implemented on the system 1012 and configured to perform the action corresponding to the user input in the system 1012.

Alternatively, an action can be taken to provide the output of the machine learning model directly to the system 1012 without any input from the user, causing the system to process the security recommendations of the machine learning model and control the settings of the system so as to mitigate security risk according to the recommendations. This may be conditioned on a confidence threshold, to ensure that automatic mitigation actions are only performed in cases where the model has a high confidence that a real cyberattack has occurred (or some threat is present). In this case, if the machine learning model 910 predicts with a high confidence that an input alert or incident is a true positive alert/incident, and it also predicts with high confidence what action to be taken to remediate the attack (for example, deleting a phishing email, or quarantining/otherwise restricting an affected user account or device), the system 1012 can automatically perform this action by directly affecting the affected entity. Other examples of actions that can be taken include: deleting an email, disabling a user, revoking a user session, quarantining a file, isolating a device, stopping a process, etc.

In some embodiments, a cybersecurity application is implemented on the system 1012, which is configured to receive the outputs of the machine learning model 910 (such as grades, similar alerts, and recommended actions) and implement an associated action, such as quarantining an email or file, restricting a user account, storing related alerts to a database for review, etc. Either or both of the above options can be implemented to perform actions based on the machine learning output, depending on the context. In some security contexts, it may be determined that for certain actions, a human user must initiate the action via the user interface, while other, less critical actions may be performed automatically in the system 1012 by providing the recommended action directly to the system 1012.

Figure 11:
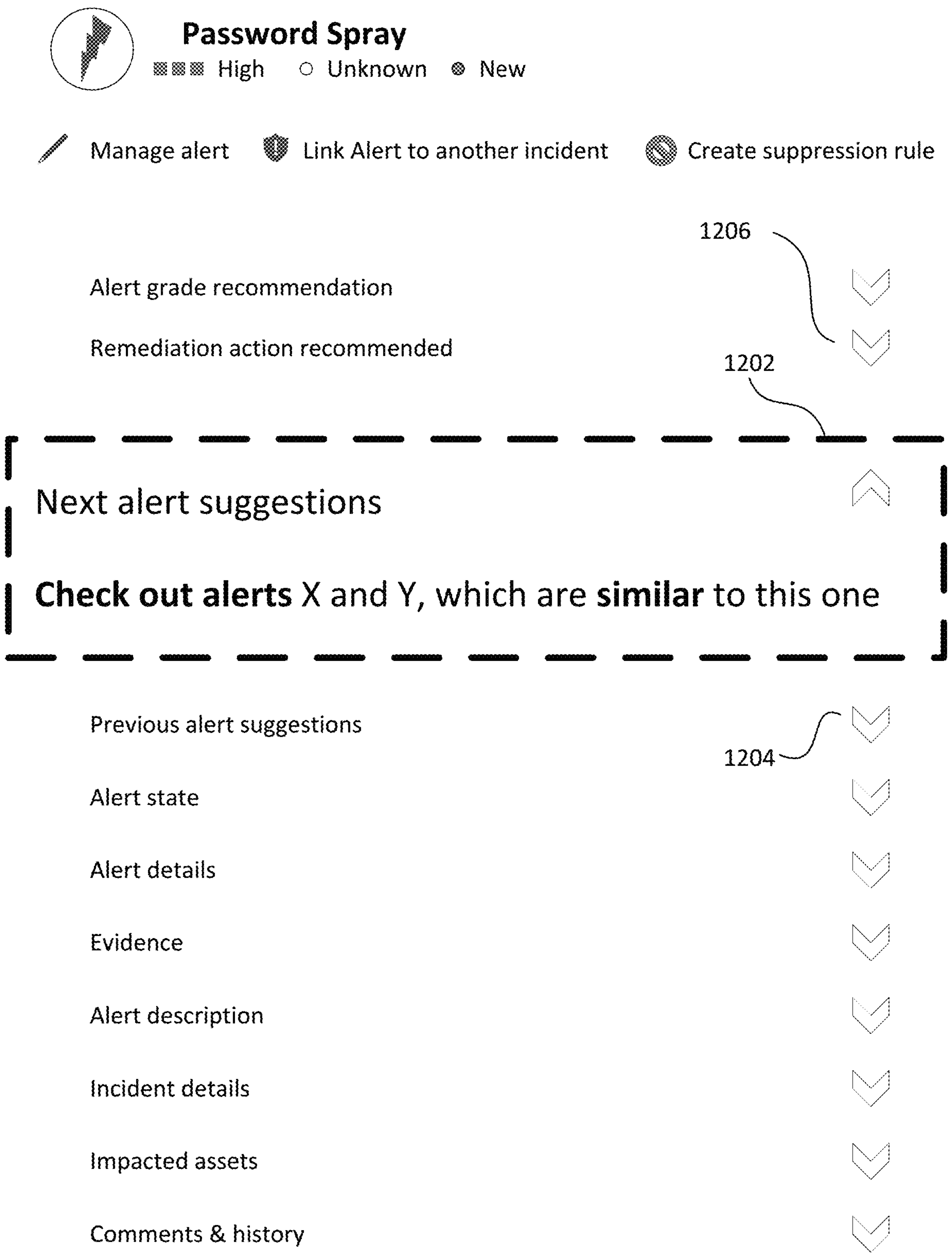
FIG. 11 is a schematic block diagram of a user interface display for a security recommendation output.

FIG. 11 shows an example user interface via which security recommendations generated by the machine learning model 910 can be output to a user, such as a security analyst of a security operations center (SOC). The SOC may be configured to process data on a computer network of an organisation, such as an enterprise computer network, and to process the data on the network to generate alerts and incidents to be investigated by a human user. The examples shown include security recommendations generated for an example 'Password Spray' alert generated within a security operations centre, indicating a potential attack in which different passwords are attempted in combination with usernames to gain access to restricted resources on the computer network. The user interface shown in FIG. 11 may be displayed to a user when a user clicks on an alert within a displayed list of alerts within an interface of the SOC.

As shown in FIG. 11, various recommendations may be displayed for the given entity, in this case an alert, based on the output of a machine learning model 910. A subset of possible recommendations that can be generated are shown in FIG. 11. A 'next alert suggestion' item 1202 is shown, which presents the user with similar alerts identified by the machine learning model 910, and which have not yet been processed by the user. Identifying these alerts allows a user to prioritise alerts, for example when the given alert shown in the user interface is determined by the user to relate to a serious breach or a cybersecurity attack, the user can quickly identify and take action on similar alerts. Even for less urgent alerts, processing similar alerts together improves the user's ability to take efficient action, since the same action may be applicable to the related alerts, allowing the user to quickly take mitigating action on a series of alerts at the same time. As noted above, similar alerts can be identified by applying a similarity model, which applies a similarity measure such as cosine similarity to the hierarchical representation of the alerts to identify the alerts whose representations are close together.

A 'previous alert suggestions' item 1204 can also be generated and displayed to the user, where the previous alerts are identified from the set of alerts that the user has already processed, for example to analyse or take mitigating action on the alert. As for the 'next alert' suggestion above, this allows users to use the knowledge of the actions already taken on similar alerts to determine a suitable mitigating action that can be taken on the current alert. Again, the similarity between alerts can be determined by applying a similarity model using a measure such as cosine similarity between the representations of alerts, to identify related alerts.

A 'remediation action' recommendation 1206 may also be displayed in the user interface, which provides a recommended action determined by the machine learning model 910, such as quarantining of a device or user account, restriction of certain resources on a computer network, etc. As described above, this may be generated by a task-specific component of machine learning model 910 trained to perform the task of identifying a suitable action, where this model may be trained based on historical data of the system, i.e. past alerts and corresponding actions taken by users. It should be noted that similar recommendations can also be made for incidents of the security operations centre. More generally, while the system of FIG. 10 and the user interface of FIG. 11 are described in the context of a security application, the same architecture could be implemented to enable a user or further application to take action based on the output of any machine learning model 910 configured to process hierarchical data of a real-world hierarchical system, such as a manufacturing system, a telecommunications system, a transportation network, etc.

Figure 12:
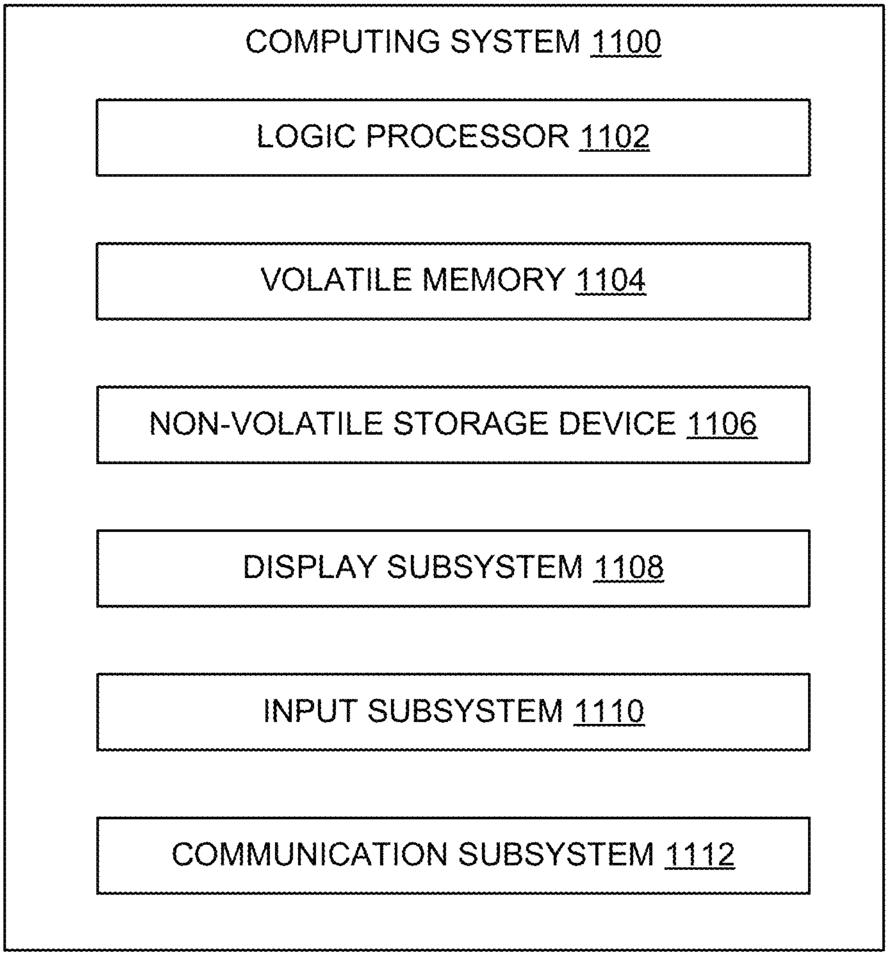
FIG. 12 is a schematic block diagram of an example computer system on which the methods described herein can be implemented.

FIG. 12 schematically shows a non-limiting example of a computing system 1100, such as a computing device or system of connected computing devices, that can enact one or more of the methods or processes described above. Computing system 1100 is shown in simplified form. Computing system 1100 includes a logic processor 1102, volatile memory 1104, and a non-volatile storage device 1106. Computing system 1100 may optionally include a display subsystem 1108, input subsystem 1110, communication subsystem 1112, and/or other components not shown in FIG. 12. When the above-described methods are implemented in a security context, the computer system 1100 may be different to the computer system used by the security operations center (SOC) to generate the data to be analysed, as well as the computer system or network being monitored by the SOC. For example, the above-described methods may be implemented in a cloud-based computer system 1100, which communicates with a different computer system of the SOC to receive security data. Alternatively, the methods described herein may be implemented on the same computer system used to generate the security alerts.

Logic processor 1102 comprises one or more physical (hardware) processors configured to carry out processing operations. For example, the logic processor 1102 may be configured to execute instructions that are part of one or more applications, programs, routines, libraries, objects, components, data structures, or other logical constructs. The logic processor 1102 may include one or more hardware processors configured to execute software instructions based on an instruction set architecture, such as a central processing unit (CPU), graphical processing unit (GPU) or other form of accelerator processor. Additionally or alternatively, the logic processor 1102 may include a hardware processor(s)) in the form of a logic circuit or firmware device configured to execute hardware-implemented logic (programmable or non-programmable) or firmware instructions. Processor(s) of the logic processor 1102 may be single-core or multi-core, and the instructions executed thereon may be configured for sequential, parallel, and/or distributed processing. Individual components of the logic processor optionally may be distributed among two or more separate devices, which may be remotely located and/or configured for coordinated processing. Aspects of the logic processor 1102 may be virtualized and executed by remotely accessible, networked computing devices configured in a cloud-computing configuration. In such a case, these virtualized aspects are run on different physical logic processors of various different machines.

Non-volatile storage device 1106 includes one or more physical devices configured to hold instructions executable by the logic processor 1102 to implement the methods and processes described herein. When such methods and processes are implemented, the state of non-volatile storage device 1106 may be transformed—e.g., to hold different data. Non-volatile storage device 1106 may include physical devices that are removable and/or built-in. Non-volatile storage device 706 may include optical memory (e.g., CD, DVD, HD-DVD, Blu-Ray Disc, etc.), semiconductor memory (e.g., ROM, EPROM, EEPROM, FLASH memory, etc.), and/or magnetic memory (e.g., hard-disk drive), or other mass storage device technology. Non-volatile storage device 1106 may include nonvolatile, dynamic, static, read/write, read-only, sequential-access, location-addressable, file-addressable, and/or content-addressable devices.

Volatile memory 1104 may include one or more physical devices that include random access memory. Volatile memory 1104 is typically utilized by logic processor 1102 to temporarily store information during processing of software instructions.

Aspects of logic processor 1102, volatile memory 1104, and non-volatile storage device 1106 may be integrated together into one or more hardware-logic components. Such hardware-logic components may include field-programmable gate arrays (FPGAs), program- and application-specific integrated circuits (PASIC/ASICs), program- and application-specific standard products (PSSP/ASSPs), systemon-a-chip (SOC), and complex programmable logic devices (CPLDs), for example. The terms "module," "program," and "engine" may be used to describe an aspect of computing system 1100 typically implemented in software by a processor to perform a particular function using portions of volatile memory, which function involves transformative processing that specially configures the processor to perform the function. Thus, a module, program, or engine may be instantiated via logic processor 1102 executing instructions held by non-volatile storage device 1106, using portions of volatile memory 1104.

Different modules, programs, and/or engines may be instantiated from the same application, service, code block, object, library, routine, API, function, etc. Likewise, the same module, program, and/or engine may be instantiated by different applications, services, code blocks, objects, routines, APIs, functions, etc. The terms "module," "program," and "engine" may encompass individual or groups of executable files, data files, libraries, drivers, scripts, database records, etc.

When included, display subsystem 1108 may be used to present a visual representation of data held by non-volatile storage device 1106. The visual representation may take the form of a graphical user interface (GUI), such as the user interface 1008. As the herein-described methods and processes change the data held by the non-volatile storage device, and thus transform the state of the non-volatile storage device, the state of display subsystem 1108 may likewise be transformed to visually represent changes in the underlying data. Display subsystem 1108 may include one or more display devices utilizing virtually any type of technology. Such display devices may be combined with logic processor 1102, volatile memory 1104, and/or non-volatile storage device 1106 in a shared enclosure, or such display devices may be peripheral display devices. When included, input subsystem 1110 may comprise or interface with one or more user-input devices such as a keyboard, mouse, touch screen, or game controller.

In some embodiments, the input subsystem may comprise or interface with selected natural user input (NUI) componentry. Such componentry may be integrated or peripheral, and the transduction and/or processing of input actions may be handled on- or off-board. Example NUI componentry may include a microphone for speech and/or voice recognition; an infrared, color, stereoscopic, and/or depth camera for machine vision and/or gesture recognition; a head tracker, eye tracker, accelerometer, and/or gyroscope for motion detection and/or intent recognition; as well as electric-field sensing componentry for assessing brain activity; and/or any other suitable sensor.

When included, communication subsystem 1112 may be configured to communicatively couple various computing devices described herein with each other, and with other devices. Communication subsystem 1112 may include wired and/or wireless communication devices compatible with one or more different communication protocols. As non-limiting examples, the communication subsystem may be configured for communication via a wireless telephone network, or a wired or wireless local- or wide-area network. In some embodiments, the communication subsystem may allow computing system 1100 to send and/or receive messages to and/or from other devices via a network such as the internet.

The term computer readable media as used herein may include computer storage media. Computer storage media may include volatile and non-volatile, removable and non-removable media (e.g., volatile memory 1104 or non-volatile storage 1106) implemented in any method or technology for storage of information, such as computer readable instructions, data structures, or program modules. Computer storage media may include RAM, ROM, electrically erasable read-only memory (EEPROM), flash memory or other memory technology, CD-ROM, digital versatile disks (DVD) or other optical storage, magnetic cassettes, magnetic tape, magnetic disk storage or other magnetic storage devices, or any other article of manufacture which can be used to store information, and which can be accessed by a computing device (e.g. the computing system 1100 or a component device thereof). Computer storage media does not include a carrier wave or other propagated or modulated data signal.

Communication media may be embodied by computer readable instructions, data structures, program modules, or other data in a modulated data signal, such as a carrier wave or other transport mechanism, and includes any information delivery media. The term "modulated data signal" may describe a signal that has one or more characteristics set or changed in such a manner as to encode information in the signal. By way of example, and not limitation, communication media may include wired media such as a wired network or direct wired connection, and wireless media such as acoustic, radio frequency (RF), infrared, and other wireless media.

A first aspect herein provides a computer-implemented method comprising receiving a first-level input associated with a first entity at a first level of a hierarchy; receiving a second-level input associated with a second entity at a second level of the hierarchy, the second entity linked to the first entity within the hierarchy; generating a first low-dimensional feature representation based on the first-level input, the first low-dimensional feature representation representing the first entity; and generating a second low-dimensional feature representation based on the first-level input, the second-level input and the first low-dimensional feature representation, the second low-dimensional feature representation representing the second entity.

The method may comprise: receiving a third input relating to a third entity at a third level of the hierarchy, the third entity being linked to the second entity within the hierarchy; and generating a third low-dimensional feature representation representing the third entity, based on the first input, the second input and the third input, and the first low-dimensional feature representation and second low-dimensional feature representation.

A plurality of first-level inputs may be received at the first level of the hierarchy, each of the plurality of first-level inputs being linked to the second-level entity within the hierarchy, wherein the method comprises: processing each of the first-level inputs to generate a first set of low-dimensional feature representations, each low-dimensional feature representation representing a respective first-level entity; and processing the second-level input, the first-level inputs and the first set of low-dimensional feature representations to generate the second low-dimensional feature representation.

Generating the third low-dimensional feature representation may comprise: joining the third input with the second input and the first input to generate a combined input; processing the combined input to generate a combined numerical representation of the text data, categorical data and/or numerical data of the combined input; joining the combined numerical representation with the second low-dimensional feature representation associated with the second entity to generate a first combined feature representation; joining the first combined feature representation with the first low-dimensional feature representation associated with the first entity to generate a second combined feature representation; performing dimensionality reduction on the combined feature representation, resulting in a second low-dimensional feature representation.

The first input and/or second input may comprise text data, categorical data and/or numerical data.

The second low-dimensional feature representation may be generated by: joining the second input with the first input to generate a combined input; generating a combined numerical representation of the text data, categorical data and/or numerical data of the combined input; joining the combined numerical representation with the first low-dimensional feature representation associated with the first entity, resulting in a combined feature representation; performing dimensionality reduction on the combined feature representation, resulting in a second low-dimensional feature representation.

The dimensionality reduction may be performed by applying a trained adversarial autoencoder model to the combined feature representation to generate a low-dimensional feature representation.

At least one of the first input and the second input may comprises a graph, wherein the step of processing the combined input to generate a combined feature representation comprises applying a graph representation learning algorithm to the graph to generate a feature representation of the graph.

The first input may comprise numerical, textual and categorical data, and wherein the first low-dimensional feature representation is generated by: processing the first input to extract textual data therefrom; processing the textual data in a large language model to generate a numerical representation of the textual data; joining the numerical representation of the textual data with numerical representations of categorical and numerical data of the first input to generate a first combined numerical representation; and performing dimensionality reduction to generate a low-dimensional feature representation associated with the first entity.

The method may further comprise applying a multi-task multi-class machine learning model to the second low-dimensional feature representation, the machine learning model comprising a plurality of sub-models, each sub-model trained to generate a classification output in relation to a different respective task.

The first input may be generated by pre-processing first entity data of the first entity to convert the first entity data to a sparse representation. The second input may be generated by pre-processing second entity data of the second entity to convert the second entity data to a sparse representation. The third input may be generated by pre-processing third entity data of the third entity to convert the third entity data to a sparse representation.

The hierarchical system may be a security management system, the method comprising generating a security classification output by applying a security model to the second low-dimensional feature representation; and causing a security action to be performed based on the security classification output.

The security classification output may comprise one or more of: a recommended action associated with the second entity; a grade associated with the second entity; and a further entity of the second level of the security management system for review.

The step of causing the security action to be performed may comprise providing the security classification output to a computer system monitored by the security management system, the computer system configured to perform a mitigating action in relation to the second entity based on the security classification output.

The security model may be a multi-task multi-class machine learning model comprising a plurality of sub-models, each sub-model trained to generate a security classification output in relation to a different respective security task.

The method may comprise: receiving a third input relating to a third entity of the security management system at a third level of the hierarchy, the third entity being linked to the second entity within the hierarchy; and generating a third low-dimensional feature representation representing the third entity, based on the first input, the second input and the third input, and the first low-dimensional feature representation and second low-dimensional feature representation.

The method may further comprise processing the third low-dimensional feature representation in the security model to: generate a second security classification output in association with the third entity; and cause a second security action to be performed based on the second security classification output.

The first entity may be an evidence entity of the security management system, wherein the second entity is an alert of the security management system, the evidence entity being associated with the alert, and the third entity is an incident of the security management system, the alert being associated with the incident.

The first-level input and/or second-level input may comprise text data, image data, categorical data and/or numerical data. Data of multiple types may be provided in an input taking the form of a dataframe. Some structured data of the input may be initially provided in the form of a text string, which can be extracted in a pre-processing step.

The second low-dimensional feature representation may be generated by: joining the second-level input with the first-level input to generate a combined input; generating a combined numerical representation of the text data, categorical data and/or numerical data of the combined input; joining the combined numerical representation with the first low-dimensional feature representation associated with the first entity, resulting in a combined feature representation; performing dimensionality reduction on the combined feature representation, resulting in a second low-dimensional feature representation.

The dimensionality reduction may be performed by applying a trained adversarial autoencoder model to the combined feature representation to generate a low-dimensional feature representation.

A second aspect herein provides a computer system comprising memory holding computer-readable instructions and one or more processors, the computer-readable instruction configured, when executed on the one or more processors, to perform the steps of: receiving first input data relating to a first entity at a first level of a hierarchical system, the first input data being in a sparse representation format; receiving second input data relating to a second entity at a second level of the hierarchical system, the second entity linked to the first entity, and the second input data being in a sparse representation format; processing the first input data to generate a first low-dimensional feature representation; processing the first input data, the second input data and the first low-dimensional numerical representation to generate a second low-dimensional feature representation, the second low-dimensional feature representation representing the second entity.

The computer-readable instructions may be configured, when executed by the one or more processors, to receive a third input relating to a third entity of the hierarchical system at a third level of the hierarchy, the third entity being linked to the second entity within the hierarchy; generate a third low-dimensional feature representation representing the third entity, based on the first input, the second input and the third input, and the first low-dimensional feature representation and second low-dimensional feature representation.

The computer-readable instructions may be configured, when executed by the one or more processors, to process one of the first low-dimensional feature representation and the second low-dimensional feature representation in a multi-task, multi-class machine learning model comprising a plurality of sub-models, each sub-model trained to generate a security classification output in relation to a different respective task associated with entities at a corresponding level of the hierarchy for that task.

A third aspect herein provides non-transitory computer readable storage medium comprising computer-executable instructions configured so as to, when executed by at least one processor, cause the at least one processor to carry out operations of: receiving first input data relating to a first entity at a first level of a hierarchical system; receiving second input data relating to a second entity at a second level of the hierarchical system, each entity of the second level of the hierarchy having one or more associated entities at the first level of the hierarchical system; processing the first input data to generate a first low-dimensional numerical representation, the first low-dimensional numerical representation representing the first entity; processing the first input data, the second input data and the first low-dimensional numerical representation to generate a second low-dimensional numerical representation, the second low-dimensional feature representation representing the second entity; generating a security classification output by applying a security model to the second low-dimensional feature representation; and causing a security action to be performed based on the security classification output.

It will be appreciated that the above embodiments have been disclosed by way of example only. Other variants or use cases may become apparent to a person skilled in the art once given the disclosure herein. The scope of the present disclosure is not limited by the above-described embodiments, but only by the accompanying claims.

The invention claimed is:

1. A computer-implemented method comprising:

receiving a first input associated with a first entity at a first level of a hierarchy;

receiving a second input associated with a second entity at a second level of the hierarchy, the second entity linked to the first entity within the hierarchy;

generating a first low-dimensional feature representation based on the first input, the first low-dimensional feature representation representing the first entity; and generating a second low-dimensional feature representation based on the first input, the second input and the first low-dimensional feature representation, the second low-dimensional feature representation representing the second entity.

2. The computer-implemented method according to claim 1, wherein the hierarchical system is a security management system, the method comprising:

generating a security classification output using a security model applied to the second low-dimensional feature representation; and causing a security action to be performed based on the security classification output.

3. The computer-implemented method according to claim 2, wherein the security classification output comprises:

a recommended action associated with the second entity, a grade associated with the second entity, or a further entity of the second level of the security management system for review.

4. The computer-implemented method according to claim 2, wherein causing the security action to be performed comprises providing the security classification output to a computer system monitored by the security management system, the computer system configured to perform a mitigating action in relation to the second entity based on the security classification output.

5. The computer-implemented method according to claim 2, wherein the security model is a multi-task multi-class machine learning model comprising a plurality of sub-models, each sub-model trained to generate a security classification output in relation to a different respective security task.

6. The computer-implemented method according to claim 2, comprising:

receiving a third input relating to a third entity of the security management system at a third level of the hierarchy, the third entity being linked to the second entity within the hierarchy;

generating a third low-dimensional feature representation representing the third entity, based on the first input, the second input and the third input, and the first low-dimensional feature representation and second low-dimensional feature representation.

7. The computer-implemented method according to claim 6, further comprising: generating in the security model based on the third low-dimensional feature representation a second security classification output in association with the third entity and causing a second security action to be performed based on the second security classification output.

8. The computer-implemented method according to claim 7, wherein generating the third low-dimensional feature representation comprises:

joining the third input with the second input and the first input, resulting in a combined input;

generating based on the combined input a combined numerical representation of the text data, categorical data and/or numerical data of the combined input;

joining the combined numerical representation with the second low-dimensional feature representation associated with the second entity, resulting in a first combined feature representation;

joining the first combined feature representation with the first low-dimensional feature representation associated with the first entity, resulting in a second combined feature representation;

performing dimensionality reduction on the combined feature representation, resulting in a second low-dimensional feature representation.

9. The computer-implemented method according to claim 6, wherein the first entity is an evidence entity of the security management system, the second entity is an alert of the security management system, the evidence entity being associated with the alert, and the third entity is an incident of the security management system, the alert being associated with the incident.

10. The computer-implemented method according to claim 1, wherein the first input or the second input comprises text data, categorical data or numerical data.

11. The computer-implemented method according to claim 10, wherein the second low-dimensional feature representation is generated by:

joining the second input with the first input, resulting in a combined input comprising the text data, the categorical data or the numerical data;

generating a combined numerical representation of the text data, the categorical data or the numerical data of the combined input;

joining the combined numerical representation with the first low-dimensional feature representation associated with the first entity, resulting in a combined feature representation;

performing dimensionality reduction on the combined feature representation, resulting in a second low-dimensional feature representation.

12. The computer-implemented method according to claim 11, wherein the dimensionality reduction is performed using a trained adversarial autoencoder model applied to the combined feature representation, resulting in a low-dimensional feature representation.

13. The computer-implemented method according to claim 11, wherein the first input or the second input comprises a graph, and wherein generating the combined feature representation comprises applying a graph representation learning algorithm to the graph.

14. The computer-implemented method according to claim 1, wherein the first input comprises numerical, textual and categorical data, and wherein the first low-dimensional feature representation is generated by:

processing the first input to extract textual data therefrom;

processing the textual data in a large language model, resulting in a numerical representation of the textual data;

joining the numerical representation of the textual data with numerical representations of categorical and numerical data of the first input, resulting in a first combined numerical representation; and performing dimensionality reduction, resulting in a low-dimensional feature representation associated with the first entity.

15. The computer-implemented method according to claim 1, the method further comprising applying a multi-task multi-class machine learning model to the second low-dimensional feature representation, the machine learning model comprising a plurality of sub-models, each sub-model trained to generate a classification output in relation to a different respective task.

16. The computer-implemented method according to claim 1, wherein the first input is generated by pre-processing first entity data of the first entity to convert the first entity data to a sparse representation and/or wherein the second input is generated by pre-processing second entity data of the second entity to convert the second entity data to a sparse representation.

17. A computer system comprising:

memory holding computer-readable instructions; and at least one processor coupled to the memory, the computer-readable instructions configured, when executed on the at least one processor, to perform operations comprising:

receiving first input data relating to a first entity at a first level of a hierarchical system, the first input data being in a sparse representation format;

receiving second input data relating to a second entity at a second level of the hierarchical system, the second entity linked to the first entity, and the second input data being in a sparse representation format;

processing the first input data, resulting in a first low-dimensional feature representation;

processing the first input data, the second input data and the first low-dimensional numerical representation, resulting in a second low-dimensional feature representation, the second low-dimensional feature representation representing the second entity.

18. The computer system according to claim 17, wherein the computer-readable instructions are configured, when executed by the at least one processor, to:

receive a third input relating to a third entity of the hierarchical system at a third level of the hierarchy, the third entity being linked to the second entity within the hierarchy;

generate a third low-dimensional feature representation representing the third entity, based on the first input, the second input and the third input, and the first low-dimensional feature representation and second low-dimensional feature representation.

19. The computer system according to claim 18, wherein the computer-readable instructions are configured, when executed by the at least one processor, to process one of the first low-dimensional feature representation and the second low-dimensional feature representation in a multi-task, multi-class machine learning model comprising a plurality of sub-models, each sub-model trained, resulting in a security classification output in relation to a different respective task associated with entities at a corresponding level of the hierarchy for that task.

20. A computer readable storage medium comprising computer-executable instructions configured so as to, when executed by at least one processor, cause the at least one processor to carry out operations of:

receiving first input data relating to a first entity at a first level of a hierarchical system;

receiving second input data relating to a second entity at a second level of the hierarchical system, each entity of the second level of the hierarchy having at least one associated entities at the first level of the hierarchical system;

processing the first input data, resulting in a first low-dimensional numerical representation, the first low-dimensional numerical representation representing the first entity;

processing the first input data, the second input data and the first low-dimensional numerical representation, resulting in a second low-dimensional numerical representation, the second low-dimensional feature representation representing the second entity;

generating a security classification output using a security model applied to the second low-dimensional feature representation; and causing a security action to be performed based on the security classification output.

* * * * *